(12) United States Patent
Akkarakaran et al.

(10) Patent No.: US 10,819,410 B2
(45) Date of Patent: Oct. 27, 2020

(54) SELECTING PHYSICAL UPLINK CONTROL CHANNEL (PUCCH) RESOURCES FOR CHANNEL STATE INFORMATION

(71) Applicant: QUALCOMM Incorporated, San Diego, CA (US)

(72) Inventors: Sony Akkarakaran, Poway, CA (US); Yi Huang, San Diego, CA (US); Tao Luo, San Diego, CA (US); Wanshi Chen, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/370,596

(22) Filed: Mar. 29, 2019

(65) Prior Publication Data

US 2019/0312618 A1 Oct. 10, 2019

Related U.S. Application Data

(60) Provisional application No. 62/654,287, filed on Apr. 6, 2018.

(51) Int. Cl.
*H04B 7/06* (2006.01)
*H04L 1/00* (2006.01)
*H04B 7/0456* (2017.01)

(52) U.S. Cl.
CPC ........... *H04B 7/063* (2013.01); *H04B 7/0486* (2013.01); *H04B 7/0626* (2013.01); *H04B 7/0632* (2013.01); *H04L 1/0026* (2013.01)

(58) Field of Classification Search
CPC .... H04B 7/063; H04B 7/0486; H04B 7/0626; H04B 7/0632; H04L 1/0026; H04L 5/0048; H04W 72/04533; H04W 24/10
See application file for complete search history.

(56) References Cited

U.S. PATENT DOCUMENTS

| | | | |
|---|---|---|---|
| 2017/0070277 A1 | 3/2017 | Si et al. | |
| 2018/0249458 A1* | 8/2018 | He | H04L 1/1607 |
| 2019/0028256 A1* | 1/2019 | Yang | H04W 72/0453 |
| 2019/0246416 A1* | 8/2019 | Park | H04L 1/1812 |

OTHER PUBLICATIONS

Ericsson: "Summary of CSI Reporting v3", 3GPP TSG-RAN WG1 Meeting #92, 3GPP Draft; R1-1803301 Summary of CSI Reporting V3, 3rd Generation Partnership Project (3GPP), Mobile Competence Centre; 658, Route Des Lucioles; F-86921 Sophia-Antipolis Cedex; France, vol. RAN WG1, No. Athens, Greece; Feb. 26, 2018-Mar. 2, 2018, Feb. 26, 2018 (Feb. 26, 2018), pp. 1-15, XP051398414, Retrieved from the Internet: URL: http://www.3gpp.org/ftp/tsg%5Fran/WG1%5FRL1/TSGR1/05F92/Docs/ [retrieved on Feb. 26, 2010] the whole document.
International Search Report and Written Opinion—PCT/US2019/025166—ISA/EPO—dated May 22, 2019.

* cited by examiner

*Primary Examiner* — Janice N Tieu
(74) *Attorney, Agent, or Firm* — Qualcomm Incorporated

(57) ABSTRACT

Various aspects of the present disclosure generally relate to wireless communication. In some aspects, a user equipment may determine a set of physical uplink control channel (PUCCH) resources to be used to transmit a channel state information (CSI) payload based at least in part on a first rank that is independent of a second rank used to construct the CSI payload; and transmit the CSI payload, to a base station (BS), using one or more resources from the set of PUCCH resources. Numerous other aspects are provided.

34 Claims, 13 Drawing Sheets

SELECTING PHYSICAL UPLINK CONTROL CHANNEL (PUCCH) RESOURCES FOR CHANNEL STATE INFORMATION

CROSS-REFERENCE TO RELATED APPLICATIONS UNDER 35 U.S.C. § 119

This application claims priority to U.S. Provisional Patent Application No. 62/654,287, filed on Apr. 6, 2018, entitled "TECHNIQUES AND APPARATUSES FOR SELECTING PHYSICAL UPLINK CONTROL CHANNEL (PUCCH) RESOURCES FOR CHANNEL STATE INFORMATION," which is hereby expressly incorporated by reference herein.

FIELD OF THE DISCLOSURE

Aspects of the present disclosure generally relate to wireless communication, and more particularly to techniques and apparatuses for selecting physical uplink control channel (PUCCH) resources for channel state information.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, etc.). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless communication network may include a number of base stations (BSs) that can support communication for a number of user equipment (UEs). A user equipment (UE) may communicate with a base station (BS) via the downlink and uplink. The downlink (or forward link) refers to the communication link from the BS to the UE, and the uplink (or reverse link) refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, and/or the like.

The above multiple access technologies have been adopted in various telecommunication standards to provide a common protocol that enables different user equipment to communicate on a municipal, national, regional, and even global level. New Radio (NR), which may also be referred to as 5G, is a set of enhancements to the LTE mobile standard promulgated by the Third Generation Partnership Project (3GPP). NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. However, as the demand for mobile broadband access continues to increase, there exists a need for further improvements in LTE and NR technologies. Preferably, these improvements should be applicable to other multiple access technologies and the telecommunication standards that employ these technologies.

SUMMARY

In some aspects, a method for wireless communication, performed by a user equipment (UE), may include determining a set of physical uplink control channel (PUCCH) resources to be used to transmit a channel state information (CSI) payload based at least in part on a first rank that is independent of a second rank used to construct the CSI payload; and transmitting the CSI payload, to a base station (BS), using one or more resources from the set of PUCCH resources.

In some aspects, a UE for wireless communication may include a memory and one or more processors operatively coupled to the memory. The one or more processors may be configured to determine a set of PUCCH resources to be used to transmit a CSI payload based at least in part on a first rank that is independent of a second rank used to construct the CSI payload; and transmit the CSI payload, to a BS, using one or more resources from the set of PUCCH resources.

In some aspects, a non-transitory computer-readable medium may store one or more instructions for wireless communication. The one or more instructions, when executed by one or more processors of a UE, may cause the one or more processors to determine a set of PUCCH resources to be used to transmit a CSI payload based at least in part on a first rank that is independent of a second rank used to construct the CSI payload; and transmit the CSI payload, to a BS, using one or more resources from the set of PUCCH resources.

In some aspects, an apparatus for wireless communication may include means for determining a set of PUCCH resources to be used to transmit a CSI payload based at least in part on a first rank that is independent of a second rank used to construct the CSI payload; and means for transmitting the CSI payload, to a BS, using one or more resources from the set of PUCCH resources.

In some aspects, a method for wireless communication, performed by a user equipment (UE), may include determining a set of physical uplink control channel (PUCCH) resources that may be used to transmit a channel state information (CSI) payload based at least in part on a parameter for constructing the CSI payload; and transmitting the CSI payload, to a base station (BS), using one or more resources from the set of PUCCH resources.

In some aspects, a user equipment for wireless communication may include one or more processors configured to determine a set of PUCCH resources that may be used to transmit a CSI payload based at least in part on a parameter for constructing the CSI payload; and transmit the CSI payload, to a BS, using one or more resources from the set of PUCCH resources.

In some aspects, a non-transitory computer-readable medium may store one or more instructions for wireless communication. The one or more instructions, when executed by one or more processors of a user equipment, may cause the one or more processors to determine a set of PUCCH resources that may be used to transmit a CSI payload based at least in part on a parameter for constructing the CSI payload; and transmit the CSI payload, to a BS, using one or more resources from the set of PUCCH resources.

In some aspects, an apparatus for wireless communication may include means for determining a set of PUCCH resources that may be used to transmit a CSI payload based at least in part on a parameter for constructing the CSI payload; and means for transmitting the CSI payload, to a BS, using one or more resources from the set of PUCCH resources.

In some aspects, a method for wireless communication, performed by a BS, may include identifying a parameter that is representative of a set of PUCCH resources that are to be used to receive a CSI payload from a UE, wherein the CSI payload includes a CSI-part1 payload and a CSI-part2 payload; receiving the CSI payload via one or more resources of the set of PUCCH resources; determining a size of the CSI payload based at least in part on an indicator of the CSI-part1 payload; and decoding the CSI payload based at least in part on the size of the CSI payload.

In some aspects, a base station for wireless communication may include one or more processors configured to identify a parameter that is representative of a set of PUCCH resources that are to be used to receive a CSI payload from a UE, wherein the CSI payload includes a CSI-part1 payload and a CSI-part2 payload; receive the CSI payload via one or more resources of the set of PUCCH resources; determine a size of the CSI payload based at least in part on an indicator of the CSI-part1 payload; and decode the CSI payload based at least in part on the size of the CSI payload.

In some aspects, a non-transitory computer-readable medium may store one or more instructions for wireless communication. The one or more instructions, when executed by one or more processors of a base station, may cause the one or more processors to identify a parameter that is representative of a set of PUCCH resources that are to be used to receive a CSI payload from a UE, wherein the CSI payload includes a CSI-part1 payload and a CSI-part2 payload; receive the CSI payload via one or more resources of the set of PUCCH resources; determine a size of the CSI payload based at least in part on an indicator of the CSI-part1 payload; and decode the CSI payload based at least in part on the size of the CSI payload.

In some aspects, an apparatus for wireless communication may include means for identifying a parameter that is representative of a set of PUCCH resources that are to be used to receive a CSI payload from a UE, wherein the CSI payload includes a CSI-part1 payload and a CSI-part2 payload; means for receiving the CSI payload via one or more resources of the set of PUCCH resources; means for determining a size of the CSI payload based at least in part on an indicator of the CSI-part1 payload; and means for decoding the CSI payload based at least in part on the size of the CSI payload.

Aspects generally include a method, apparatus, system, computer program product, non-transitory computer-readable medium, user equipment, base station, wireless communication device, and processing system as substantially described herein with reference to and as illustrated by the accompanying drawings.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Figure 1:
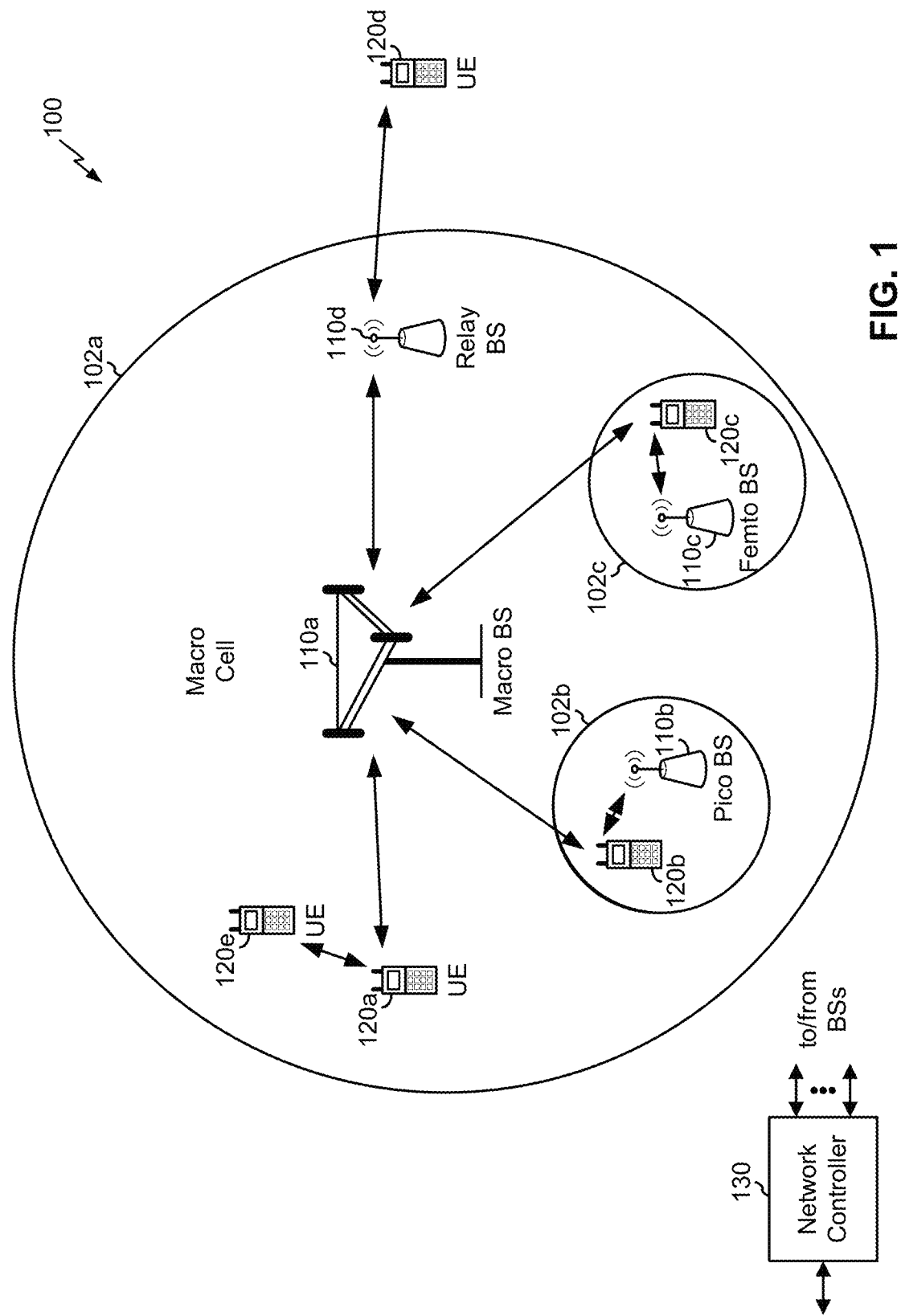
FIG. 1 is a block diagram conceptually illustrating an example of a wireless communication network, in accordance with various aspects of the present disclosure.

In many instances, multiple sets of physical uplink control channel (PUCCH) resources may be configured to enable a user equipment (UE) to communicate uplink control information (UCI) to a base station (BS). The UCI may include channel state information (CSI) that indicates a quality of a channel used for downlink communication from the BS to the UE. In such cases, the UE selects one of the multiple sets of PUCCH resources to transmit the CSI based on a size of a CSI payload. The CSI payload may include a CSI-part1 payload and a CSI-part2 payload. In such cases, the size of the CSI payload depends on a size of the CSI-part1 payload, which may be fixed, and a size of the CSI-part2 payload, which may vary according to channel quality of multiple-input and multiple-output (MIMO) layers of a downlink channel. Accordingly, in previous techniques, the UE may construct the size of the CSI payload based on the quality of the downlink. Therefore, in the previous techniques, the size of the CSI payload varies, and thus the set of PUCCH resources (or a size of the set of PUCCH resources) that is used by the UE to transmit the CSI can vary. Accordingly, the BS may not be notified of which of the multiple sets of PUCCH resources are to be used or a size of the set of the PUCCH resources is to be used to receive the CSI because the BS does not have an indication of the size of the CSI payload.

Some aspects described herein configure one or more parameters that are to be used by the UE and BS to determine which set of PUCCH resources are to be used or a size of the PUCCH resources to be used to transmit and/or receive a CSI payload. The BS may identify, based on the parameters, which set of PUCCH resources include the CSI and which set of PUCCH resources are to be decoded to receive the CSI. In some aspects, the BS may monitor all possible resources (or configurations of the sets of resources) according to the available set of parameters that may be used by the UE to send the CSI payload. In some aspects, a predetermined parameter may be configured (e.g., according to a specification of a network associated with the BS and UE) for the UE to transmit the CSI payload (e.g., regardless of the size of the CSI payload) and the BS to receive the payload. Accordingly, the BS and UE may synchronously be configured to communicate the CSI. As a result, processing resources of the BS can be conserved by preventing the BS from monitoring all resources of the PUCCH for the CSI and/or needing to decode multiple sets of resources of the PUCCH to identify the CSI.

Furthermore, in some instances, a scheduling request (SR) occasion may be scheduled to occur during transmission of a CSI payload. In previous techniques, the CSI payload may be dropped to allow for an SR to be transmitted. According to some aspects, described herein, an SR may be handled in association with the UE transmitting the CSI payload. For example, the UE may perform a joint encoding of the SR and the CSI payload when an SR occasion aligns with transmitting the CSI payload. Additionally, or alternatively, the UE may multiplex the SR with the CSI payload into the UCI. Accordingly, some aspects described herein may conserve network resources by combining an SR communication with a CSI communication.

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, etc. (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with 3G and/or 4G wireless technologies, aspects of the present disclosure can be applied in other generation-based communication systems, such as 5G and later, including NR technologies.

FIG. 1 is a diagram illustrating a network 100 in which aspects of the present disclosure may be practiced. The network 100 may be an LTE network or some other wireless network, such as a 5G or NR network. Wireless network 100 may include a number of BSs 110 (shown as BS 110a, BS 110b, BS 110c, and BS 110d) and other network entities. A BS is an entity that communicates with user equipment (UEs) and may also be referred to as a base station, a NR BS, a Node B, a gNB, a 5G node B (NB), an access point, a transmit receive point (TRP), and/or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). A BS for a macro cell may be referred to as a macro BS. A BS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some examples, a cell may not necessarily be stationary, and the geographic area of the cell may move according to the location of a mobile BS. In some examples, the BSs may be interconnected to one another and/or to one or more other BSs or network nodes (not shown) in the access network 100 through various types of backhaul interfaces such as a direct physical connection, a virtual network, and/or the like using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay station 110d may communicate with macro BS 110a and a UE 120d in order to facilitate communication between BS 110a and UE 120d. A relay station may also be referred to as a relay BS, a relay base station, a relay, etc.

Wireless network 100 may be a heterogeneous network that includes BSs of different types, e.g., macro BSs, pico BSs, femto BSs, relay BSs, etc. These different types of BSs may have different transmit power levels, different coverage areas, and different impacts on interference in wireless network 100. For example, macro BSs may have a high transmit power level (e.g., 5 to 40 Watts) whereas pico BSs, femto BSs, and relay BSs may have lower transmit power levels (e.g., 0.1 to 2 Watts).

A network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, etc. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, location tags, etc., that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components, memory components, and/or the like.

In general, any number of wireless networks may be deployed in a given geographic area. Each wireless network may support a particular RAT and may operate on one or more frequencies. A RAT may also be referred to as a radio technology, an air interface, etc. A frequency may also be referred to as a carrier, a frequency channel, etc. Each frequency may support a single RAT in a given geographic area in order to avoid interference between wireless networks of different RATs. In some cases, NR or 5G RAT networks may be deployed.

In some examples, access to the air interface may be scheduled, wherein a scheduling entity (e.g., a base station) allocates resources for communication among some or all devices and equipment within the scheduling entity's service area or cell. Within the present disclosure, as discussed further below, the scheduling entity may be responsible for scheduling, assigning, reconfiguring, and releasing resources for one or more subordinate entities. That is, for scheduled communication, subordinate entities utilize resources allocated by the scheduling entity.

Base stations are not the only entities that may function as a scheduling entity. That is, in some examples, a UE may function as a scheduling entity, scheduling resources for one or more subordinate entities (e.g., one or more other UEs). In this example, the UE is functioning as a scheduling entity, and other UEs utilize resources scheduled by the UE for wireless communication. A UE may function as a scheduling entity in a peer-to-peer (P2P) network, and/or in a mesh network. In a mesh network example, UEs may optionally communicate directly with one another in addition to communicating with the scheduling entity.

Thus, in a wireless communication network with a scheduled access to time—frequency resources and having a cellular configuration, a P2P configuration, and a mesh configuration, a scheduling entity and one or more subordinate entities may communicate utilizing the scheduled resources.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, and/or the like), a mesh network, and/or the like. In this case, the UE 120 may perform scheduling operations, resource selection operations, and/or other operations described elsewhere herein as being performed by the base station 110.

In some aspects, described herein, one or more UEs 120 and/or one or more base stations 110 of network 100 may communicate and/or operate according to a specification. The example specification may identify one or more parameters for determining which set or sets of PUCCH resources are to include a CSI payload. In some aspects the PUCCH resources that include the CSI payload and/or the CSI payload, itself, may include an SR.

As indicated above, FIG. 1 is provided merely as an example. Other examples may differ from what is described with regard to FIG. 1.

Figure 2:
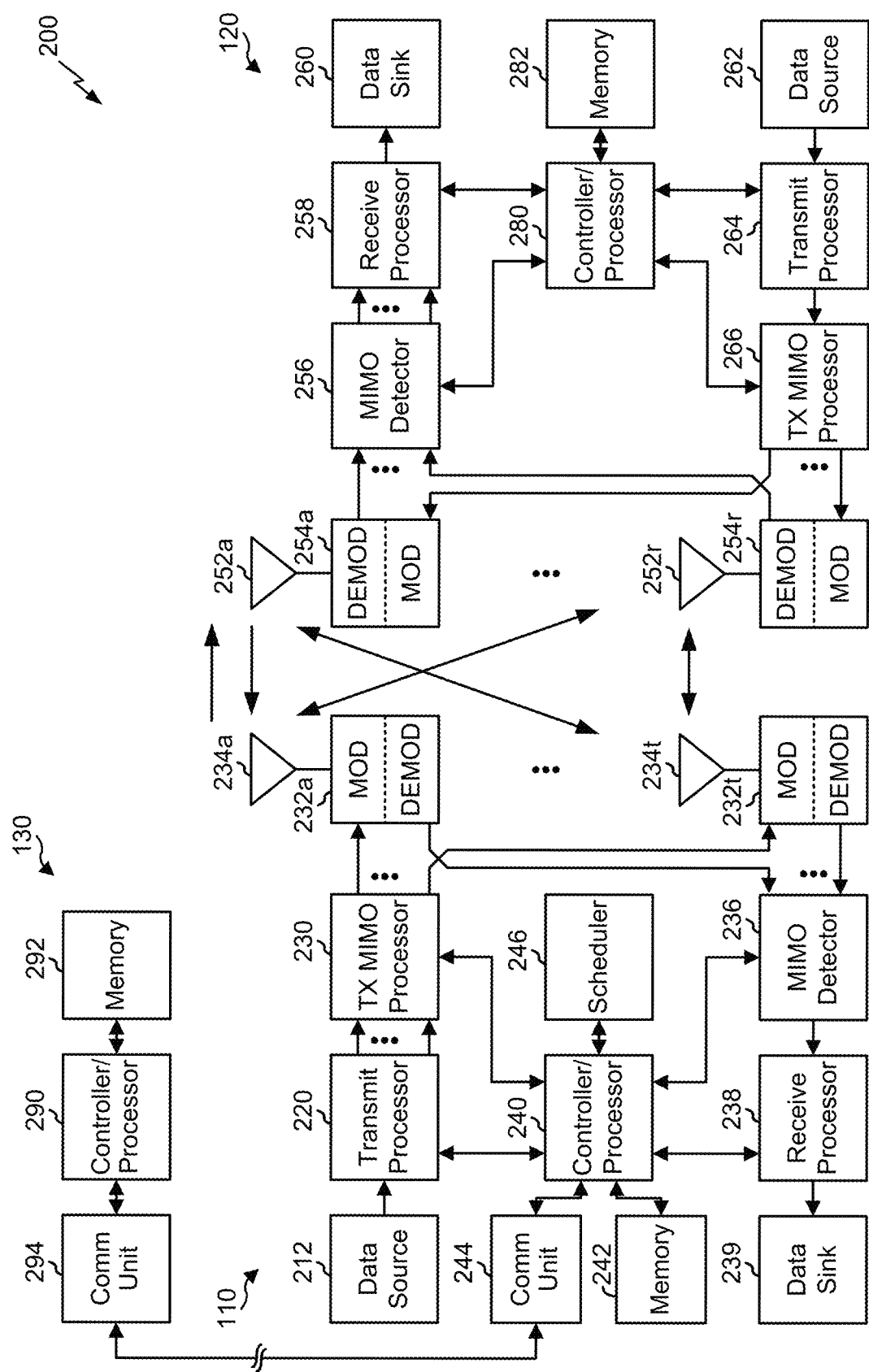
FIG. 2 is a block diagram conceptually illustrating an example of a base station in communication with a user equipment (UE) in a wireless communication network, in accordance with various aspects of the present disclosure.

FIG. 2 shows a block diagram of a design 200 of base station 110 and UE 120, which may be one of the base stations and one of the UEs in FIG. 1. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs)

received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI), etc.) and control information (e.g., CQI requests, grants, upper layer signaling, etc.) and provide overhead symbols and control symbols. Transmit processor 220 may also generate reference symbols for reference signals (e.g., the cell-specific reference signal (CRS)) and synchronization signals (e.g., the primary synchronization signal (PSS) and secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232*a* through 232*t*. Each modulator 232 may process a respective output symbol stream (e.g., for OFDM, etc.) to obtain an output sample stream. Each modulator 232 may further process (e.g., convert to analog, amplify, filter, and upconvert) the output sample stream to obtain a downlink signal. T downlink signals from modulators 232*a* through 232*t* may be transmitted via T antennas 234*a* through 234*t*, respectively. According to various aspects described in more detail below, the synchronization signals can be generated with location encoding to convey additional information.

At UE 120, antennas 252*a* through 252*r* may receive the downlink signals from base station 110 and/or other base stations and may provide received signals to demodulators (DEMODs) 254*a* through 254*r*, respectively. Each demodulator 254 may condition (e.g., filter, amplify, downconvert, and digitize) a received signal to obtain input samples. Each demodulator 254 may further process the input samples (e.g., for OFDM, etc.) to obtain received symbols. A MIMO detector 256 may obtain received symbols from all R demodulators 254*a* through 254*r*, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. A channel processor may determine reference signal received power (RSRP), received signal strength indicator (RSSI), reference signal received quality (RSRQ), channel quality indicator (CQI), etc.

On the uplink, at UE 120, a transmit processor 264 may receive and process data from a data source 262 and control information (e.g., for reports comprising RSRP, RSSI, RSRQ, CQI, etc.) from controller/processor 280. Transmit processor 264 may also generate reference symbols for one or more reference signals. The symbols from transmit processor 264 may be precoded by a TX MIMO processor 266 if applicable, further processed by modulators 254*a* through 254*r* (e.g., for DFT-s-OFDM, CP-OFDM, etc.), and transmitted to base station 110. At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Network controller 130 may include communication unit 294, controller/processor 290, and memory 292.

In some aspects, one or more components of UE 120 may be included in a housing. Controller/processor 240 of base station 110, controller/processor 280 of UE 120, and/or any other component(s) of FIG. 2 may perform one or more techniques associated with selecting physical uplink control channel (PUCCH) resources for channel state information, as described in more detail elsewhere herein. For example, controller/processor 240 of base station 110, controller/processor 280 of UE 120, and/or any other component(s) of FIG. 2 may perform or direct operations of, for example, process 1000 of FIG. 10, process 1100 of FIG. 11, process 1200 of FIG. 12, and/or other processes as described herein. Memories 242 and 282 may store data and program codes for base station 110 and UE 120, respectively. A scheduler 246 may schedule UEs for data transmission on the downlink and/or uplink.

Figure 10:
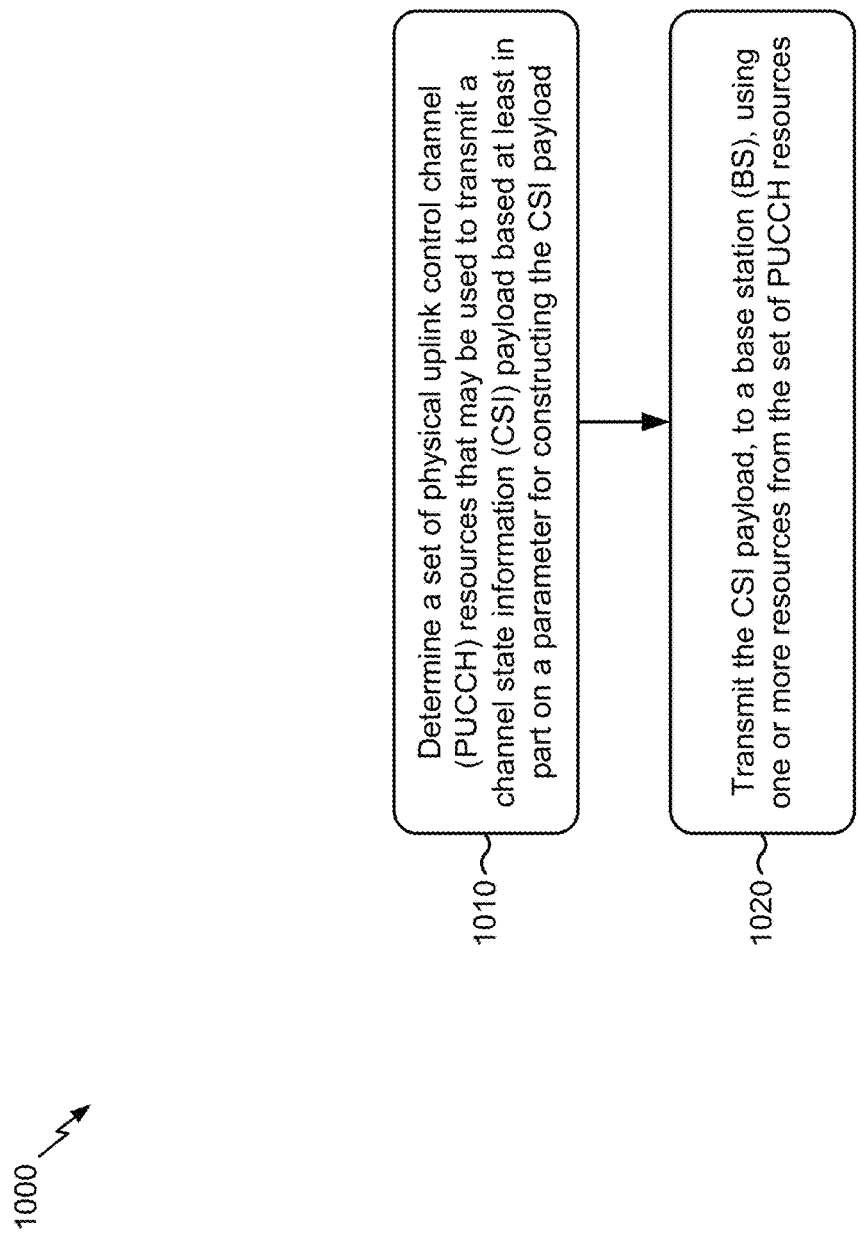
FIG. 10 is a diagram illustrating an example process performed, for example, by a user equipment, in accordance with various aspects of the present disclosure.

The stored program codes, when executed by processor 280 and/or other processors and modules at UE 120, may cause the UE 120 to perform operations described with respect to process 1000 of FIG. 10, and/or other processes as described herein. The stored program codes, when executed by processor 240 and/or other processors and modules at base station 110, may cause the base station 110 to perform operations described with respect to process 1100 of FIG. 11, and/or other processes as described herein. A scheduler 246 may schedule UEs for data transmission on the downlink and/or uplink.

In some aspects, UE 120 may include means for determining a set of physical uplink control channel (PUCCH) resources that may be used to transmit a channel state information (CSI) payload based at least in part on a parameter for constructing the CSI payload, means for transmitting the CSI payload, to a base station (BS), using one or more resources from the set of PUCCH resources, and/or the like. Additionally, or alternatively, the UE 120 may include means for determining a set of PUCCH resources to be used to transmit a CSI payload based at least in part on a first rank that is independent of a second rank used to construct the CSI payload; means for transmitting the CSI payload, to a BS, using one or more resources from the set of PUCCH resources; and/or the like. In some aspects, such means may include one or more components of UE 120 described in connection with FIG. 2.

In some aspects, base station 110 may include means for identifying a parameter that is representative of a set of physical uplink control channel (PUCCH) resources that are to be used to receive a channel state information (CSI) payload from a user equipment (UE), wherein the CSI payload includes a CSI-part1 payload and a CSI-part2 payload; means for receiving the CSI payload via one or more resources of the set of PUCCH resources; means for determining a size of the CSI payload based at least in part on an indicator of the CSI-part1 payload; and means for decoding the CSI payload based at least in part on the size of the CSI payload; and/or the like. In some aspects, such means may include one or more components of base station 110 described in connection with FIG. 2.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of processor 280.

As indicated above, FIG. 2 is provided merely as an example. Other examples may differ from what is described with regard to FIG. 2.

Figure 3A:
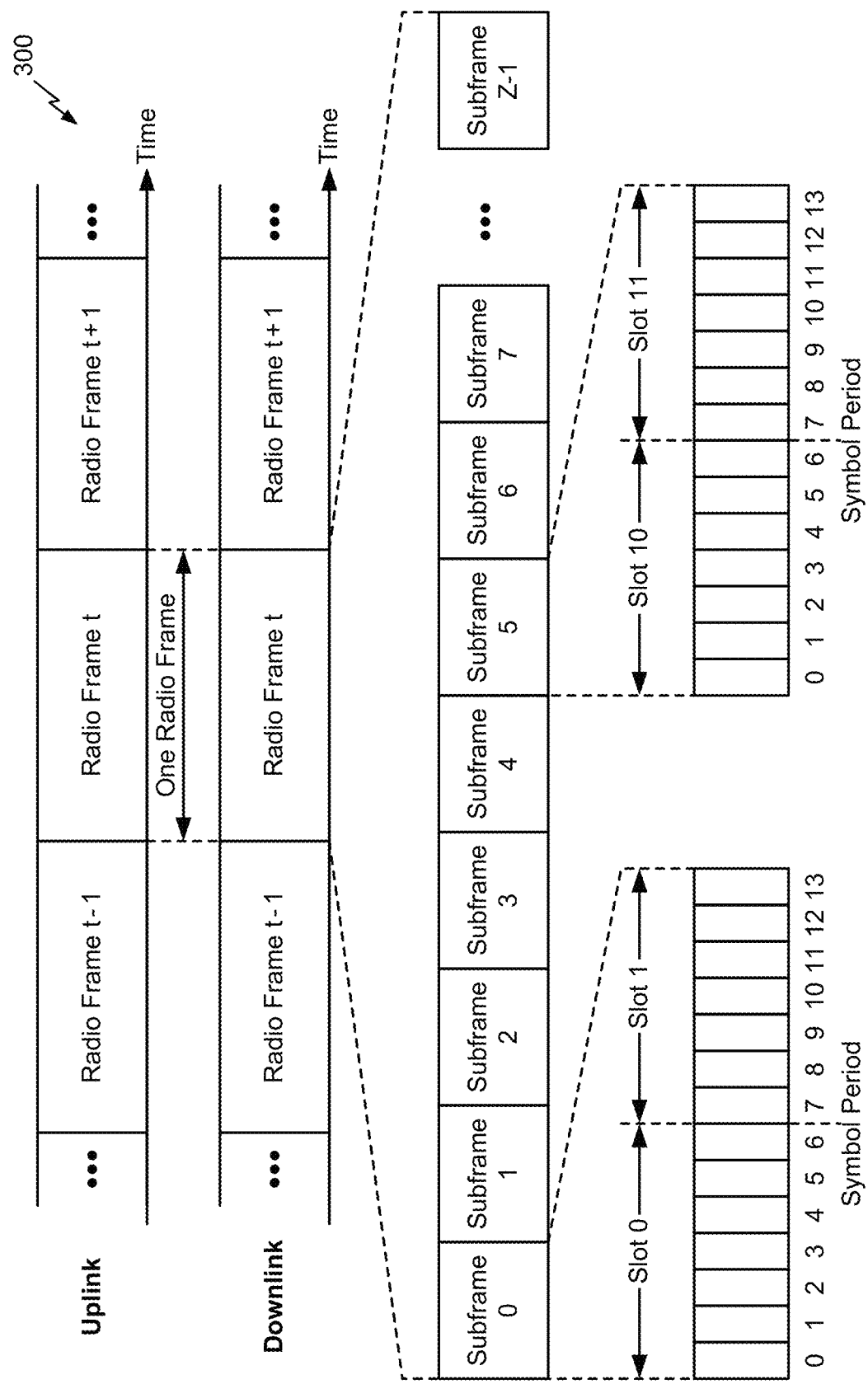
FIG. 3A is a block diagram conceptually illustrating an example of a frame structure in a wireless communication network, in accordance with various aspects of the present disclosure.

FIG. 3A shows an example frame structure 300 for FDD in a telecommunications system (e.g., NR). The transmission timeline for each of the downlink and uplink may be partitioned into units of radio frames. Each radio frame may have a predetermined duration and may be partitions into a set of Z (Z≥1) subframes (e.g., with indices of 0 through Z−1). Each subframe may include a set of slots (e.g., two slots per subframe are shown in FIG. 3A). Each slot may include a set of L symbol periods. For example, each slot may include seven symbol periods (e.g., as shown in FIG. 3A), fifteen symbol periods, and/or the like. In a case where the subframe includes two slots, the subframe may include 2L symbol periods, where the 2L symbol periods in each subframe may be assigned indices of 0 through 2L−1. In some aspects, a scheduling unit for the FDD may frame-based, subframe-based, slot-based, symbol-based, and/or the like.

While some techniques are described herein in connection with frames, subframes, slots, and/or the like, these techniques may equally apply to other types of wireless communication structures, which may be referred to using terms other than "frame," "subframe," "slot," and/or the like in 5G NR. In some aspects, a wireless communication structure may refer to a periodic time-bounded communication unit defined by a wireless communication standard and/or protocol. Additionally, or alternatively, different configurations of wireless communication structures than those shown in FIG. 3A may be used.

In certain telecommunications (e.g., NR), a base station may transmit synchronization signals. For example, a base station may transmit a primary synchronization signal (PSS), a secondary synchronization signal (SSS), and/or the like, on the downlink for each cell supported by the base station. The PSS and SSS may be used by UEs for cell search and acquisition. For example, the PSS may be used by UEs to determine symbol timing, and the SSS may be used by UEs to determine a physical cell identifier, associated with the base station, and frame timing. The base station may also transmit a physical broadcast channel (PBCH). The PBCH may carry some system information, such as system information that supports initial access by UEs.

In some aspects, one or more of the synchronization signals may include one or more parameters that are used to identify which of the PUCCH resources are to be used to transmit and/or receive a CSI payload.

In some aspects, the base station may transmit the PSS, the SSS, and/or the PBCH in accordance with a synchronization communication hierarchy (e.g., a synchronization signal (SS) hierarchy) including multiple synchronization communications (e.g., SS blocks), as described below in connection with FIG. 3B.

Figure 3B:
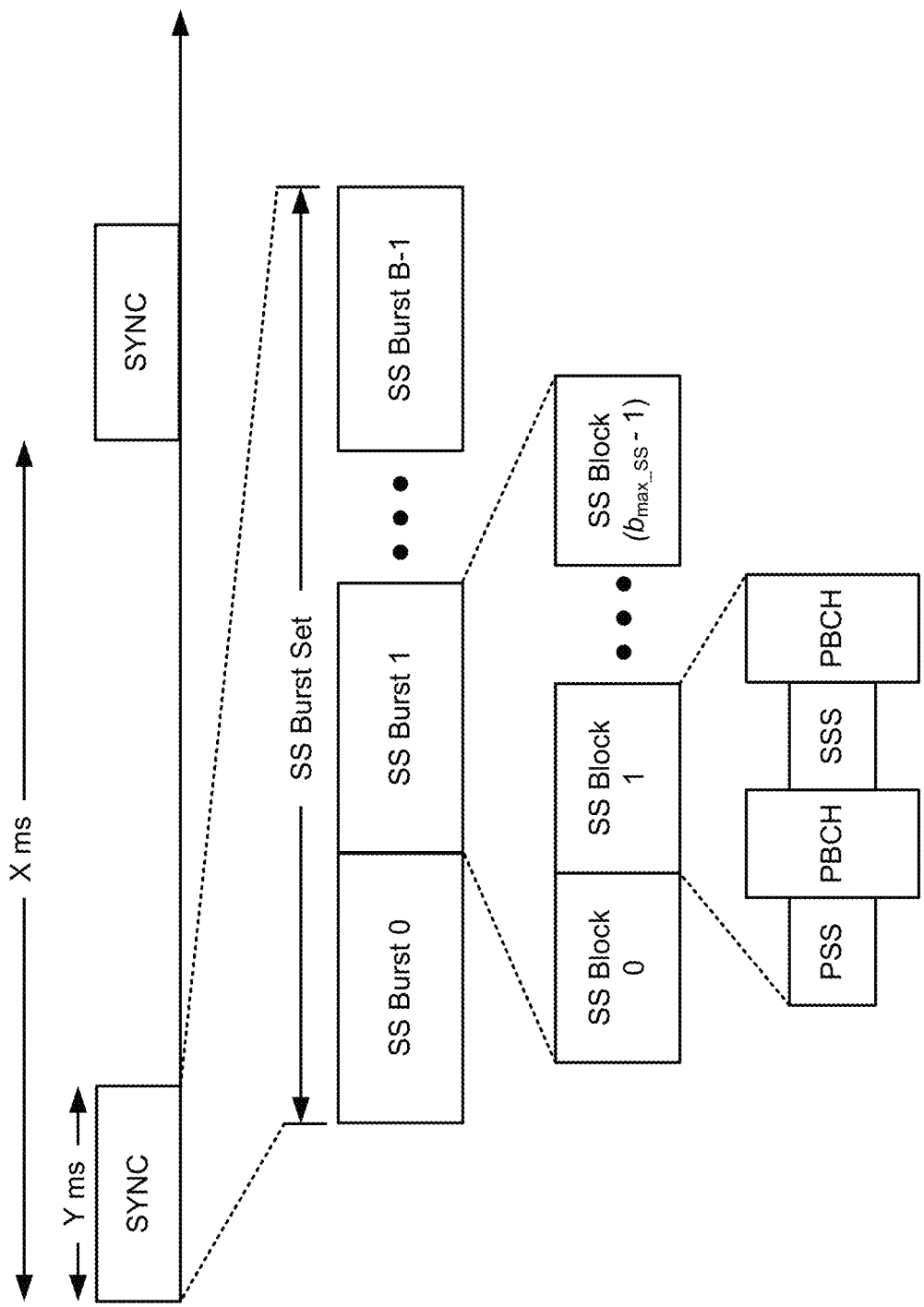
FIG. 3B is a block diagram conceptually illustrating an example synchronization communication hierarchy in a wireless communication network, in accordance with various aspects of the present disclosure.

FIG. 3B is a block diagram conceptually illustrating an example SS hierarchy, which is an example of a synchronization communication hierarchy. As shown in FIG. 3B, the SS hierarchy may include an SS burst set, which may include a plurality of SS bursts (identified as SS burst 0 through SS burst B−1, where B is a maximum number of repetitions of the SS burst that may be transmitted by the base station). As further shown, each SS burst may include one or more SS blocks (identified as SS block 0 through SS block ($b_{max\_SS-1}$), where $b_{max\_SS-1}$ is a maximum number of SS blocks that can be carried by an SS burst). In some aspects, different SS blocks may be beam-formed differently. An SS burst set may be periodically transmitted by a wireless node, such as every X milliseconds, as shown in FIG. 3B. In some aspects, an SS burst set may have a fixed or dynamic length, shown as Y milliseconds in FIG. 3B.

The SS burst set shown in FIG. 3B is an example of a synchronization communication set, and other synchronization communication sets may be used in connection with the techniques described herein. Furthermore, the SS block shown in FIG. 3B is an example of a synchronization communication, and other synchronization communications may be used in connection with the techniques described herein.

In some aspects, an SS block includes resources that carry the PSS, the SSS, the PBCH, and/or other synchronization signals (e.g., a tertiary synchronization signal (TSS)) and/or synchronization channels. In some aspects, multiple SS blocks are included in an SS burst, and the PSS, the SSS, and/or the PBCH may be the same across each SS block of the SS burst. In some aspects, a single SS block may be included in an SS burst. In some aspects, the SS block may be at least four symbol periods in length, where each symbol carries one or more of the PSS (e.g., occupying one symbol), the SSS (e.g., occupying one symbol), and/or the PBCH (e.g., occupying two symbols).

In some aspects, a synchronization communication (e.g., an SS block) may include a base station synchronization communication for transmission, which may be referred to as a Tx BS-SS, a Tx gNB-SS, and/or the like. In some aspects, a synchronization communication (e.g., an SS block) may include a base station synchronization communication for reception, which may be referred to as an Rx BS-SS, an Rx gNB-SS, and/or the like. In some aspects, a synchronization communication (e.g., an SS block) may include a user equipment synchronization communication for transmission, which may be referred to as a Tx UE-SS, a Tx NR-SS, and/or the like. A base station synchronization communication (e.g., for transmission by a first base station and reception by a second base station) may be configured for synchronization between base stations, and a user equipment synchronization communication (e.g., for transmission by a base station and reception by a user equipment) may be configured for synchronization between a base station and a user equipment.

In some aspects, a base station synchronization communication may include different information than a user equipment synchronization communication. For example, one or more base stations synchronization communications may exclude PBCH communications. Additionally, or alternatively, a base station synchronization communication and a user equipment synchronization communication may differ with respect to one or more of a time resource used for transmission or reception of the synchronization communication, a frequency resource used for transmission or reception of the synchronization communication, a periodicity of the synchronization communication, a waveform of the synchronization communication, a beamforming parameter used for transmission or reception of the synchronization communication, and/or the like.

In some aspects, the symbols of an SS block are consecutive, as shown in FIG. 3B. In some aspects, the symbols of an SS block are non-consecutive. Similarly, in some aspects, one or more SS blocks of the SS burst may be transmitted in consecutive radio resources (e.g., consecutive symbol periods) during one or more subframes. Additionally, or alternatively, one or more SS blocks of the SS burst may be transmitted in non-consecutive radio resources.

In some aspects, the SS bursts may have a burst period, whereby the SS blocks of the SS burst are transmitted by the base station according to the burst period. In other words, the SS blocks may be repeated during each SS burst. In some aspects, the SS burst set may have a burst set periodicity, whereby the SS bursts of the SS burst set are transmitted by the base station according to the fixed burst set periodicity. In other words, the SS bursts may be repeated during each SS burst set.

The base station may transmit system information, such as system information blocks (SIBs) on a physical downlink shared channel (PDSCH) in certain subframes. The base station may transmit control information/data on a physical downlink control channel (PDCCH) in C symbol periods of a subframe, where B may be configurable for each subframe. The base station may transmit traffic data and/or other data on the PDSCH in the remaining symbol periods of each subframe.

In some aspects, a UE may determine a channel quality of a downlink communication using the PDSCH and/or PDCCH. In some aspects, the UE may construct a CSI payload according to the channel quality of the downlink communication.

As indicated above, FIGS. 3A and 3B are provided as examples. Other examples may differ from what is described with regard to FIGS. 3A and 3B.

Figure 4:
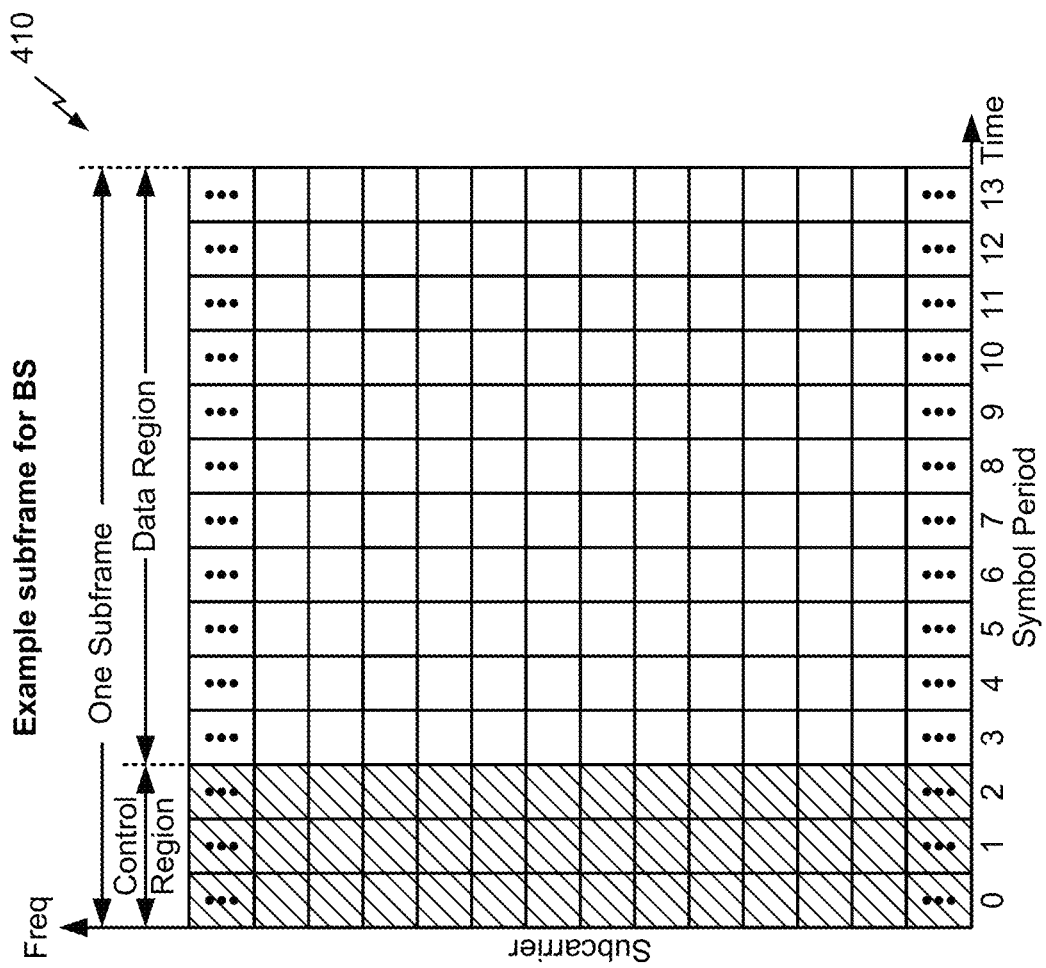
FIG. 4 is a block diagram conceptually illustrating an example subframe format with a normal cyclic prefix, in accordance with various aspects of the present disclosure.

FIG. 4 shows an example subframe format 410 with a normal cyclic prefix. The available time frequency resources may be partitioned into resource blocks. Each resource block may cover a set of subcarriers (e.g., 12 subcarriers) in one slot and may include a number of resource elements. Each resource element may cover one subcarrier in one symbol period (e.g., in time) and may be used to send one modulation symbol, which may be a real or complex value. In some aspects, subframe format 410 may be used for transmission of SS blocks that carry the PSS, the SSS, the PBCH, and/or the like, as described herein.

An interlace structure may be used for each of the downlink and uplink for FDD in certain telecommunications systems (e.g., NR). For example, Q interlaces with indices of 0 through Q−1 may be defined, where Q may be equal to 4, 6, 8, 10, or some other value. Each interlace may include subframes that are spaced apart by Q frames. In particular, interlace q may include subframes q, q+Q, q+2Q, etc., where $q \in \{0, \ldots, Q-1\}$.

A UE may be located within the coverage of multiple BSs. One of these BSs may be selected to serve the UE. The serving BS may be selected based at least in part on various criteria such as received signal strength, received signal quality, path loss, and/or the like. Received signal quality may be quantified by a signal-to-noise-and-interference ratio (SNIR), or a reference signal received quality (RSRQ), or some other metric. The UE may operate in a dominant interference scenario in which the UE may observe high interference from one or more interfering BSs.

While aspects of the examples described herein may be associated with NR or 5G technologies, aspects of the present disclosure may be applicable with other wireless communication systems. New Radio (NR) may refer to radios configured to operate according to a new air interface (e.g., other than Orthogonal Frequency Divisional Multiple Access (OFDMA)-based air interfaces) or fixed transport layer (e.g., other than Internet Protocol (IP)). In aspects, NR may utilize OFDM with a CP (herein referred to as cyclic prefix OFDM or CP-OFDM) and/or SC-FDM on the uplink, may utilize CP-OFDM on the downlink and include support for half-duplex operation using TDD. In aspects, NR may, for example, utilize OFDM with a CP (herein referred to as CP-OFDM) and/or discrete Fourier transform spread orthogonal frequency-division multiplexing (DFT-s-OFDM) on the uplink, may utilize CP-OFDM on the downlink and include support for half-duplex operation using TDD. NR may include Enhanced Mobile Broadband (eMBB) service targeting wide bandwidth (e.g., 80 megahertz (MHz) and beyond), millimeter wave (mmW) targeting high carrier frequency (e.g., 60 gigahertz (GHz)), massive MTC (mMTC) targeting non-backward compatible MTC techniques, and/or mission critical targeting ultra reliable low latency communications (URLLC) service.

In some aspects, a single component carrier bandwidth of 100 MHz may be supported. NR resource blocks may span 12 sub-carriers with a sub-carrier bandwidth of 60 or 120 kilohertz (kHz) over a 0.1 millisecond (ms) duration. Each radio frame may include 40 subframes with a length of 10 ms. Consequently, each subframe may have a length of 0.25 ms. Each subframe may indicate a link direction (e.g., DL or UL) for data transmission and the link direction for each subframe may be dynamically switched. Each subframe may include DL/UL data as well as DL/UL control data.

Beamforming may be supported and beam direction may be dynamically configured. MIMO transmissions with precoding may also be supported. MIMO configurations in the DL may support up to 8 transmit antennas with multi-layer DL transmissions up to 8 streams and up to 2 streams per UE. Multi-layer transmissions with up to 2 streams per UE may be supported. Aggregation of multiple cells may be supported with up to 8 serving cells. Alternatively, NR may support a different air interface, other than an OFDM-based interface. NR networks may include entities such as central units or distributed units.

According to some implementations, a UE may construct a CSI payload according to channel quality of the multi-layer DL transmissions. For example, UE 120 may determine a rank of the multi-layer DL transmissions corresponding to the quality of the multi-layer DL transmissions. More specifically, if one layer of the multi-layer DL transmissions satisfies a threshold quality, a rank of 1 (Rank=1) may be determined to be representative of the channel quality, if two layers of the multi-layer DL transmissions satisfies the threshold quality, a rank of 2 (Rank=2) may be determined to be representative of the channel quality, and so on. In some aspects, the rank may be used to construct the CSI payload (e.g., to determine whether all or part of a CSI-part2 payload is to be included in the CSI payload).

As indicated above, FIG. 4 is provided as an example. Other examples may differ from what is described with regard to FIG. 4.

Figure 5:
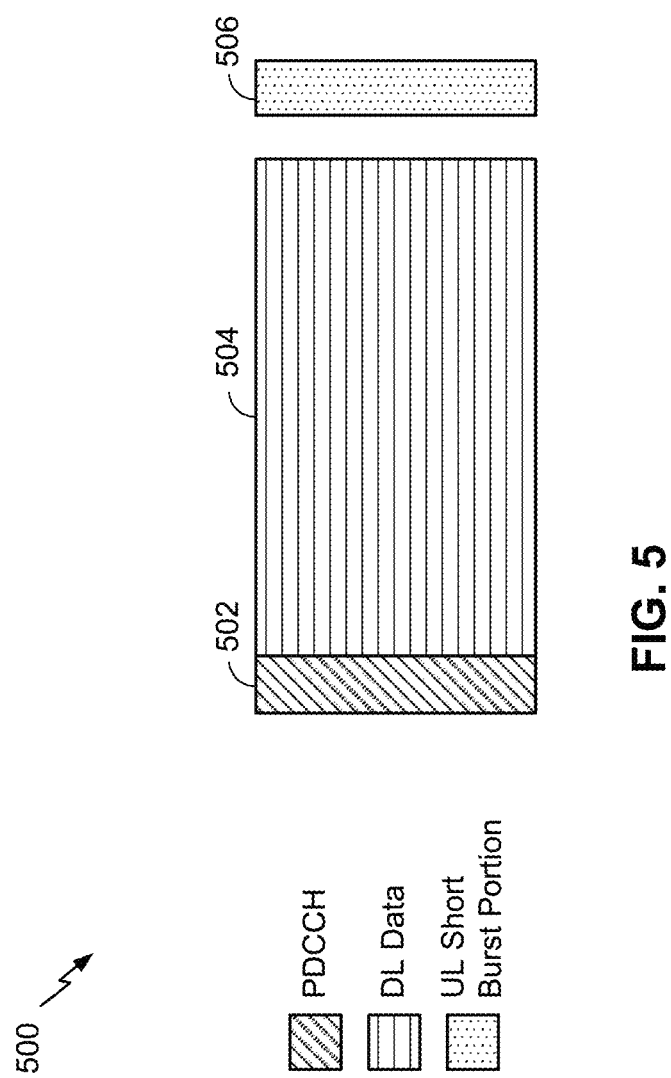
FIG. 5 is a diagram illustrating an example of a downlink (DL)-centric subframe, in accordance with various aspects of the present disclosure.

FIG. 5 is a diagram 500 showing an example of a DL-centric subframe or wireless communication structure. The DL-centric subframe may include a control portion 502. The control portion 502 may exist in the initial or beginning portion of the DL-centric subframe. The control portion 502 may include various scheduling information and/or control information corresponding to various portions of the DL-centric subframe. In some configurations, the control portion 502 may be a physical DL control channel (PDCCH), as indicated in FIG. 5. In some aspects, the control portion 502 may include legacy PDCCH information, shortened PDCCH (sPDCCH) information), a control format indicator (CFI) value (e.g., carried on a physical control format indicator channel (PCFICH)), one or more grants (e.g., downlink grants, uplink grants, etc.), and/or the like.

The DL-centric subframe may also include a DL data portion 504. The DL data portion 504 may sometimes be referred to as the payload of the DL-centric subframe. The DL data portion 504 may include the communication resources utilized to communicate DL data from the scheduling entity (e.g., UE or BS) to the subordinate entity (e.g., UE). In some configurations, the DL data portion 504 may be a physical DL shared channel (PDSCH).

The DL-centric subframe may also include an UL short burst portion 506. The UL short burst portion 506 may sometimes be referred to as an UL burst, an UL burst portion, a common UL burst, a short burst, an UL short burst, a common UL short burst, a common UL short burst portion, and/or various other suitable terms. In some aspects, the UL short burst portion 506 may include one or more reference signals. Additionally, or alternatively, the UL short burst portion 506 may include feedback information corresponding to various other portions of the DL-centric subframe. For example, the UL short burst portion 506 may include feedback information corresponding to the control portion 502 and/or the data portion 504. Non-limiting examples of information that may be included in the UL short burst portion 506 include an ACK signal (e.g., a PUCCH ACK, a PUSCH ACK, an immediate ACK), a NACK signal (e.g., a PUCCH NACK, a PUSCH NACK, an immediate NACK), a scheduling request (SR), a buffer status report (BSR), a HARQ indicator, a channel state indication (CSI), a channel quality indicator (CQI), a sounding reference signal (SRS), a demodulation reference signal (DMRS), PUSCH data, and/or various other suitable types of information. The UL short burst portion 506 may include additional or alternative information, such as information pertaining to random access channel (RACH) procedures, scheduling requests, and various other suitable types of information.

As illustrated in FIG. 5, the end of the DL data portion 504 may be separated in time from the beginning of the UL short burst portion 506. This time separation may sometimes be referred to as a gap, a guard period, a guard interval, and/or various other suitable terms. This separation provides time for the switch-over from DL communication (e.g., reception operation by the subordinate entity (e.g., UE)) to UL communication (e.g., transmission by the subordinate entity (e.g., UE)). The foregoing is merely one example of a DL-centric wireless communication structure, and alternative structures having similar features may exist without necessarily deviating from the aspects described herein.

In some aspects, UL short burst portion 506 may include one or more sets of PUCCH resources configured to carry a CSI payload. In some aspects, BS 110 and/or UE 120 may be configured to identify which set of the PUCCH resources are to include the CSI payload, based on one or more parameters provided to BS 110 and/or UE 120. In some aspects, the one or more parameters may be predetermined according to a specification of network 100.

As indicated above, FIG. 5 is provided merely as an example. Other examples may differ from what is described with regard to FIG. 5.

Figure 6:
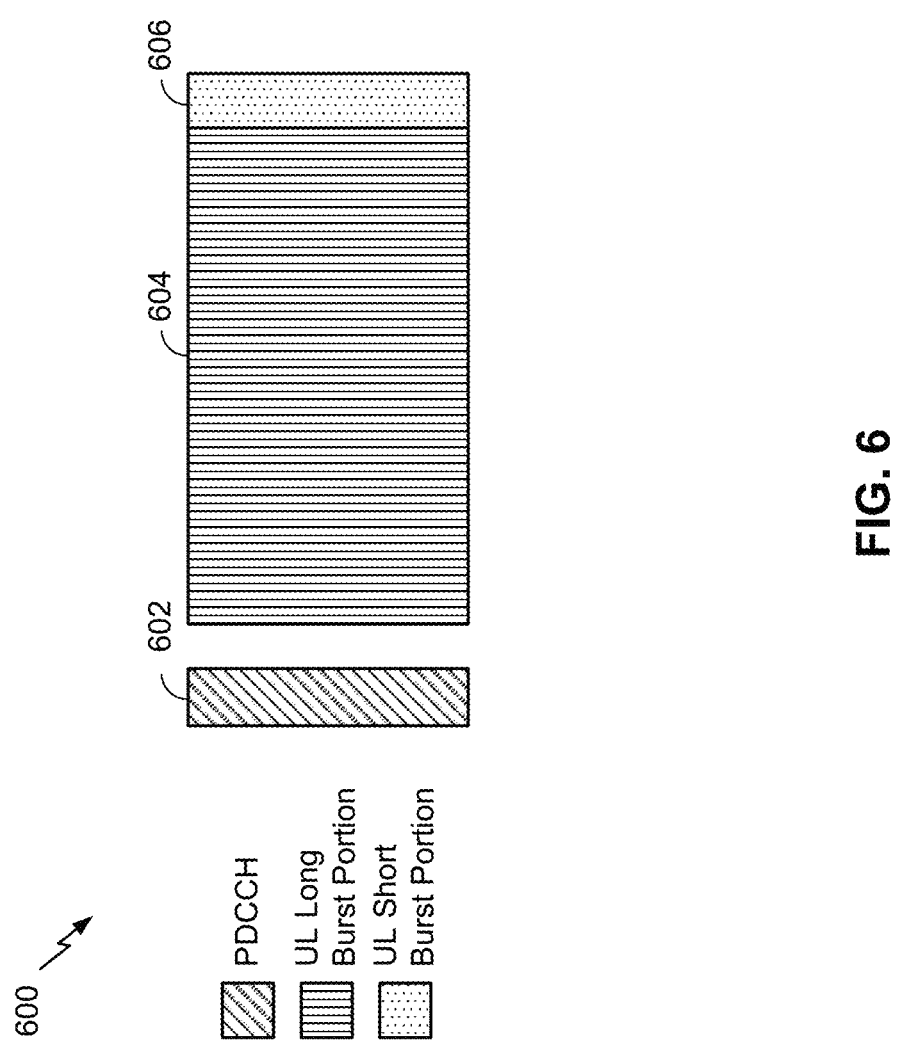
FIG. 6 is a diagram illustrating an example of an uplink (UL)-centric subframe, in accordance with various aspects of the present disclosure.

FIG. 6 is a diagram 600 showing an example of an UL-centric subframe or wireless communication structure. The UL-centric subframe may include a control portion 602. The control portion 602 may exist in the initial or beginning portion of the UL-centric subframe. The control portion 602 in FIG. 6 may be similar to the control portion 502 described above with reference to FIG. 5. The UL-centric subframe may also include an UL long burst portion 604. The UL long burst portion 604 may sometimes be referred to as the payload of the UL-centric subframe. The UL portion may refer to the communication resources utilized to communicate UL data from the subordinate entity (e.g., UE) to the scheduling entity (e.g., UE or BS). In some configurations, the control portion 602 may be a physical DL control channel (PDCCH).

As illustrated in FIG. 6, the end of the control portion 602 may be separated in time from the beginning of the UL long burst portion 604. This time separation may sometimes be referred to as a gap, guard period, guard interval, and/or various other suitable terms. This separation provides time for the switch-over from DL communication (e.g., reception operation by the scheduling entity) to UL communication (e.g., transmission by the scheduling entity).

The UL-centric subframe may also include an UL short burst portion 606. The UL short burst portion 606 in FIG. 6 may be similar to the UL short burst portion 506 described above with reference to FIG. 5, and may include any of the information described above in connection with FIG. 5. Accordingly, UL short burst portion 606 may include one or more sets of PUCCH resources configured to carry a CSI payload, as described herein. The foregoing is merely one example of an UL-centric wireless communication structure, and alternative structures having similar features may exist without necessarily deviating from the aspects described herein.

In some circumstances, two or more subordinate entities (e.g., UEs) may communicate with each other using sidelink signals. Real-world applications of such sidelink communications may include public safety, proximity services, UE-to-network relaying, vehicle-to-vehicle (V2V) communications, Internet of Everything (IoE) communications, IoT communications, mission-critical mesh, and/or various other suitable applications. Generally, a sidelink signal may refer to a signal communicated from one subordinate entity (e.g., UE1) to another subordinate entity (e.g., UE2) without relaying that communication through the scheduling entity (e.g., UE or BS), even though the scheduling entity may be utilized for scheduling and/or control purposes. In some examples, the sidelink signals may be communicated using a licensed spectrum (unlike wireless local area networks, which typically use an unlicensed spectrum).

In one example, a wireless communication structure, such as a frame, may include both UL-centric subframes and DL-centric subframes. In this example, the ratio of UL-centric subframes to DL-centric subframes in a frame may be dynamically adjusted based at least in part on the amount of UL data and the amount of DL data that are transmitted. For example, if there is more UL data, then the ratio of UL-centric subframes to DL-centric subframes may be increased. Conversely, if there is more DL data, then the ratio of UL-centric subframes to DL-centric subframes may be decreased.

As indicated above, FIG. 6 is provided merely as an example. Other examples may differ from what is described with regard to FIG. 6.

Figure 7:
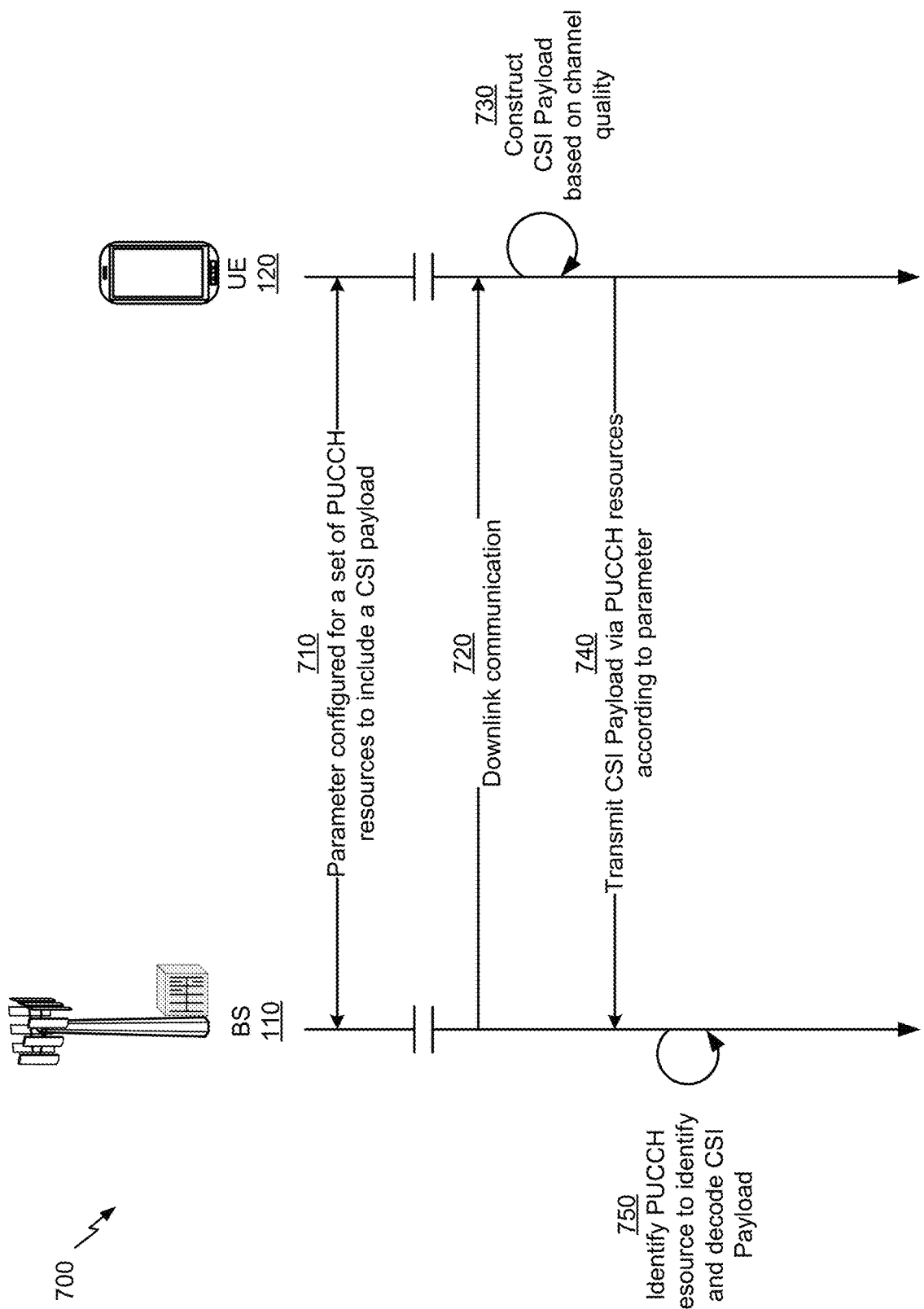
FIGS. 7-9 are diagrams illustrating an example of selecting physical uplink control channel (PUCCH) resources for channel state information, in accordance with various aspects of the present disclosure.

FIG. 7 is a diagram illustrating an example 700 of selecting physical uplink control channel (PUCCH) resources for channel state information, in accordance with various aspects of the present disclosure. Example implementation 700 includes a BS 110 and a UE 120. As mentioned above, in some instances, using previous techniques to transmit a CSI payload (e.g., a payload that includes a CSI-part1 payload and a CSI-part2 payload), UE 120 may select a set of PUCCH resources based on a size of the CSI payload. In such instances, BS 110 is not notified of which PUCCH resources are to be used to receive the CSI payload because BS 110 is not notified of the size of the CSI payload, as the CSI payload is constructed by UE 120. In example implementation 700, a parameter is configured to identify which of the PUCCH resources are to be used to communicate the CSI payload; thus both BS 110 and UE 120 may use an indicated, preconfigured, or predetermined parameter to identify which of the PUCCH resources are to include the CSI payload.

As shown in FIG. 7, and by reference 710, a parameter is configured for a set of PUCCH resources to include a CSI payload. In some aspects, the parameter may be configured upon setup of a network (e.g., network 100) associated with BS 110 and/or UE 120. In some aspects, the parameter may be predetermined according to a specification of the network. In some aspects, the parameter may be one parameter of a plurality of possible parameters. In some aspects, the parameter may be configured based on one or more communications between BS 110 and/or UE 120 (e.g., a synchronization signal, a radio resource control (RRC) communication, and/or the like). In some aspects, the parameter may correspond to one or more parameters that may be used by UE 120 to construct the CSI payload.

In some aspects, the parameter may be representative of a capacity of the set of PUCCH resources that are to be used to communicate the CSI payload. For example, the parameter may include a value (e.g., a possible rank (or rank indicator) corresponding to a possible downlink channel quality determined by UE 120), and the greater the size of the value (e.g., the greater the possible rank), the greater the capacity of the set of PUCCH resources, and/or the lower the size of the value (e.g., the lower the possible rank), the lower the capacity of the set of PUCCH resources.

In some aspects, the parameter may be configurable. For example, the value of the parameter may be configurable according to one or more thresholds of the parameter that may be used to construct the CSI payload. For example, if the parameter corresponds to a rank, the parameter may have various configured values that are to be used (e.g., by BS 110) to determine which PUCCH resources include the CSI payload. The parameter may be configurable for different UEs 120, for different transmissions of the CSI payload by a same UE 120, and/or the like. In such cases, the parameter is to be provided to BS 110 and/or UE 120 (e.g., by a user, by a network administrator, and/or the like).

According to some aspects, the parameter may be fixed in that the parameter is not a variable parameter that UE 120 uses to construct the CSI payload of that particular transmission (e.g., is not dependent upon a size of the CSI payload). However, in some aspects, the parameter may correspond to one or more parameters that UE 120 may use when constructing the CSI payload, though the parameter may not be the parameter that UE 120 uses to construct the CSI payload. Accordingly, in some aspects, regardless of the size of the CSI payload, the parameter may correspond to a particular size (e.g., a maximum size, a minimum size, a predetermined size, and/or the like) of the CSI payload. In some instances, the parameter may be representative of a minimum size of the CSI payload or a maximum size of the CSI payload. In such cases, that particular size may correspond to a possible downlink channel quality that could be used to construct the CSI payload.

Accordingly, the parameter may be provided to BS 110 and/or UE 120 so that BS 110 and UE 120 may identify which of the PUCCH resources are to be used to communicate the CSI payload.

As further shown in FIG. 7, and by reference number 720, BS 110 sends a downlink communication to UE 120. In some aspects, the downlink communication may be transmitted by BS 110 and received by UE 120 using multiple layers (e.g., using MIMO) of a downlink channel. As shown by reference number 730, UE 120 constructs the CSI payload based on a channel quality (e.g., a downlink channel quality (DCQ)) associated with the downlink communication. Accordingly, the content of the CSI payload may be based on the channel quality. Accordingly, UE 120 may measure the channel quality of the downlink communication to determine how to construct a CSI payload. In some instances, the size of the CSI payload may correspond to the channel quality associated with the downlink communication.

In some aspects, when sending the CSI payload, UE 120 may include an SR in the set of PUCCH resources. For example, UE 120 may determine that when one or more SR occasions are scheduled during transmission of the CSI, referred to herein as a CSI payload transmission (e.g., an aperiodic semi-persistent (A/SP)-CSI that is triggered by downlink control information), UE 120 is to include an SR request within the CSI payload. Accordingly, UE 120 may include the SR within the CSI payload using joint encoding. In some aspects, UE 120 may use joint encoding when a starting symbol of an SR occasion is a same starting symbol as the CSI payload. In some aspects, the size of the SR corresponds to a number of bits corresponding to the number of the SR occasions. As an example, the number N of bits of the SR may correspond to:

$$N = \log_2(K+1) \quad (1)$$

where K is the number of SR occasions that overlap the CSI payload transmission. Accordingly, the size of the SR may be based at least in part on a number of the SR occasions that overlap with the CSI payload transmission. In some aspects, from the above, UE 120 may identify one SR occasion that is to include an SR (a positive SR). In such cases, the SR may consume one bit of the CSI payload. Therefore, UE 120 may construct the CSI payload to include an SR using joint encoding.

Additionally, or alternatively, UE 120 may multiplex the SR and the CSI payload within the set of PUCCH resources. For example, one or more SR bits may be configured to occupy one or more resource elements of the PUCCH resources used to transmit the CSI payload and the CSI payload may be configured to occupy the remaining resources. In some aspects, UE 120 may use a resource element mapping and/or beta factors (e.g., an acknowledgement resource indicator (ARI)) to allocate one or more resource elements between the SR and content of the CSI payload. Accordingly, UE 120 may multiplex an SR into the PUCCH resources used to communicate the CSI payload.

As further shown in FIG. 7, and by reference number 740, UE 120 transmits the CSI payload via PUCCH resources according to the parameter. Therefore, rather than selecting a set of PUCCH resources based on a size of the CSI payload, UE 120 uses the set of PUCCH resources that corresponds to the parameter configured for the set of PUCCH resources that are to include the CSI payload. In some instances, when the size of the CSI payload exceeds a capacity of the set of PUCCH resources to be used to transmit the CSI payload, UE 120 may drop one or more blocks of the CSI payload (e.g., one or more blocks of a CSI-part2 payload). Additionally, or alternatively, when the size of the CSI payload is less than the capacity of the set of PUCCH resources to be used to transmit the CSI payload, UE 120 may include copies of one or more blocks of the CSI payload (e.g., one or more blocks of a CSI-part2 payload).

As further shown in FIG. 7, and by reference number 750, BS 110 identifies the PUCCH resource, of the set of PUCCH resources, to identify and decode the CSI payload. For example, upon receipt of the PUCCH, BS 110 may identify which resources of the PUCCH include the CSI payload. Furthermore, BS 110 may decode the CSI payload based on a size of the CSI payload corresponding to the parameter. In some aspects, to decode the CSI payload, BS 110 may decode a CSI-part1 payload of the CSI payload and determine a remaining intended size of a CSI-part2 payload based on an indicator (e.g., that corresponds to a rank determined from the channel quality of the downlink communication) in the CSI-part1. However, the actual size of the CSI-part2 may not correspond to the intended size of the CSI-part2, as UE 120 may not generate the CSI payload using a parameter that corresponds to the indicator.

Accordingly, BS 110 and/or UE 120 may use a configured parameter to communicate a CSI payload. As a result, BS 110 may be able to receive and decode the CSI payload, regardless of the parameter that UE 120 uses to construct the CSI payload.

As indicated above, FIG. 7 is provided as an example. Other examples may differ from what is described with respect to FIG. 7.

Figure 8:
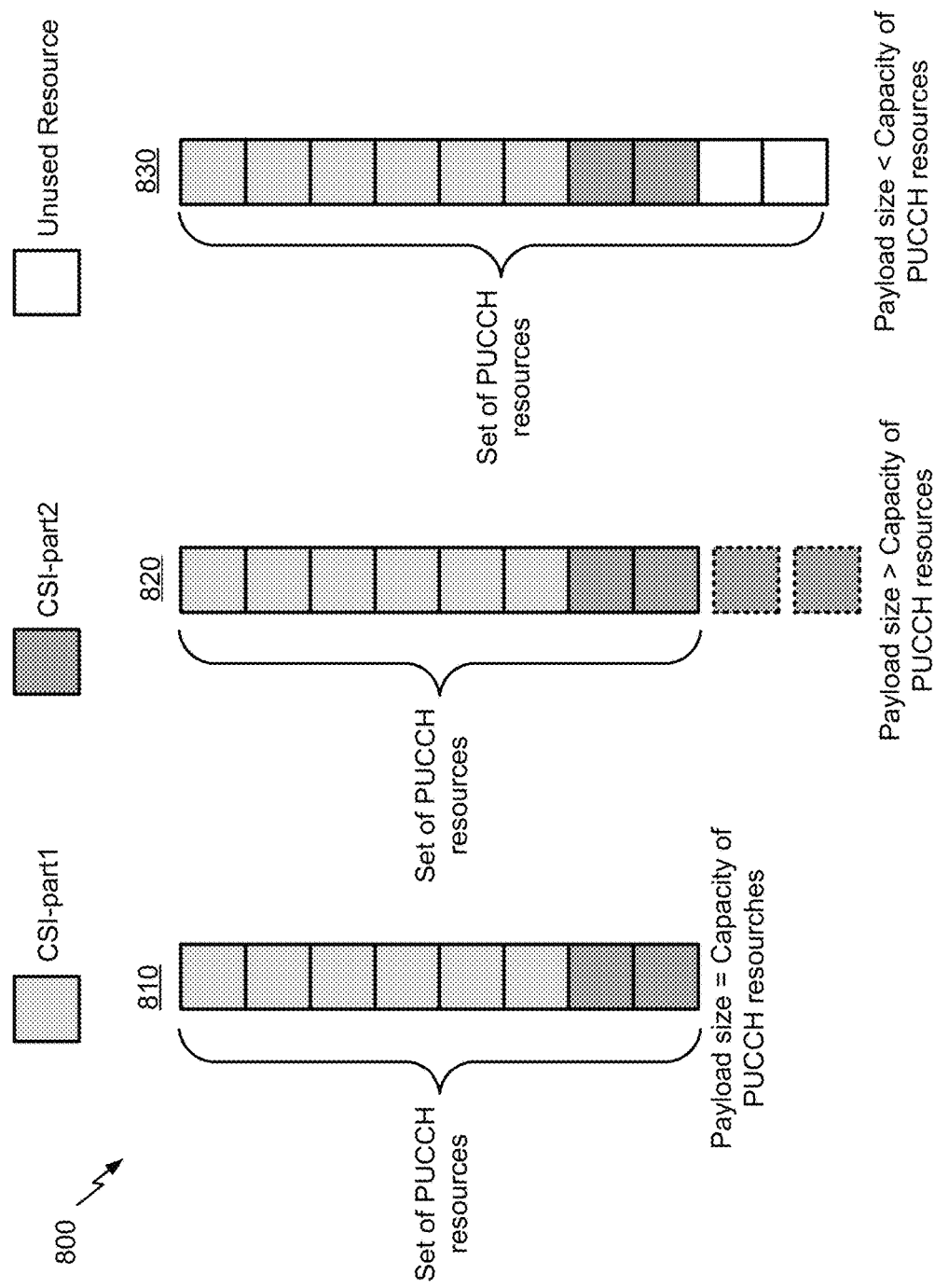

FIG. 8 is a diagram illustrating an example 800 of selecting physical uplink control channel (PUCCH) resources for channel state information, in accordance with various aspects of the present disclosure. In example 800, example sets of PUCCH resources, as corresponding to a parameter indicated to BS 110 and UE 120 and used to communicate a CSI payload, are shown.

As shown by reference number 810, a CSI-part1 payload occupies six resource elements of the set of eight PUCCH resources, and a CSI-part2 payload occupies two resource elements of the set of PUCCH resources. In this instance, the payload size may correspond to (or be equal to) the capacity of the PUCCH resources. For example, UE 120 may have constructed the CSI payload based on a channel quality associated with a downlink communication. UE 120 may have determined that two layers (of two or more MIMO layers) of the channel satisfied a threshold quality level. Therefore, the payload size of CSI-part2 may have been two, and, in combination with the size of CSI-part1 payload, the payload size of CSI payload would be equal to the capacity of set of PUCCH resources. As such, the parameter (or value of the parameter) used to determine the PUCCH resources (or the size of the PUCCH resources) may have been the same value as the parameter used to construct the CSI payload.

As shown by reference number 820 in FIG. 8, the CSI-part1 payload occupies six resource elements of the set of eight PUCCH resources and the CSI-part2 payload occupies two resource elements of the set of PUCCH resources. In this instance, the payload size was to be greater than the capacity of the PUCCH resources. For example, UE 120 may have constructed the CSI payload based on a channel quality associated with a downlink communication. UE 120 may have determined that four layers (of four or more MIMO layers) of the channel satisfied a threshold quality level. Therefore, the payload size of CSI-part2 may have been four. However, this payload size (ten), in combination with the size of CSI-part1 payload, was greater than the capacity (eight) of the PUCCH resources. As such, the parameter (or value of the parameter) used to determine the PUCCH resources (or the size of the PUCCH resources) was different than the parameter (or value of the parameter) used to construct the CSI payload. In this case, and as shown, two blocks of the CSI-part2 payload may be dropped.

As shown by reference number 830 in FIG. 8, the CSI-part1 payload occupies six resource elements of the set of ten PUCCH resources and the CSI-part2 payload occupies two resource elements of the set of PUCCH resources. In this instance, the payload size is to be less than the capacity of the PUCCH resources. For example, UE 120 may have constructed the CSI payload based on a channel quality associated with a downlink communication. UE 120 may have determined that two layers (of two or more MIMO layers) of the channel satisfied a threshold quality level. Therefore, the payload size of CSI-part2 may have been two. However, this payload size (eight), in combination with the size of CSI-part1 payload, was less than the capacity (ten) of the PUCCH resources. As such, the parameter (or value of the parameter) used to determine the PUCCH resources (or the size of the PUCCH resources) was different than the parameter (or value of the parameter) used to construct the CSI payload. In this case, two blocks of the CSI-part2 payload may be copied and added to occupy the unused resource elements.

As indicated above, FIG. 8 is provided as an example. Other examples may differ from what is described with respect to FIG. 8.

Figure 9:
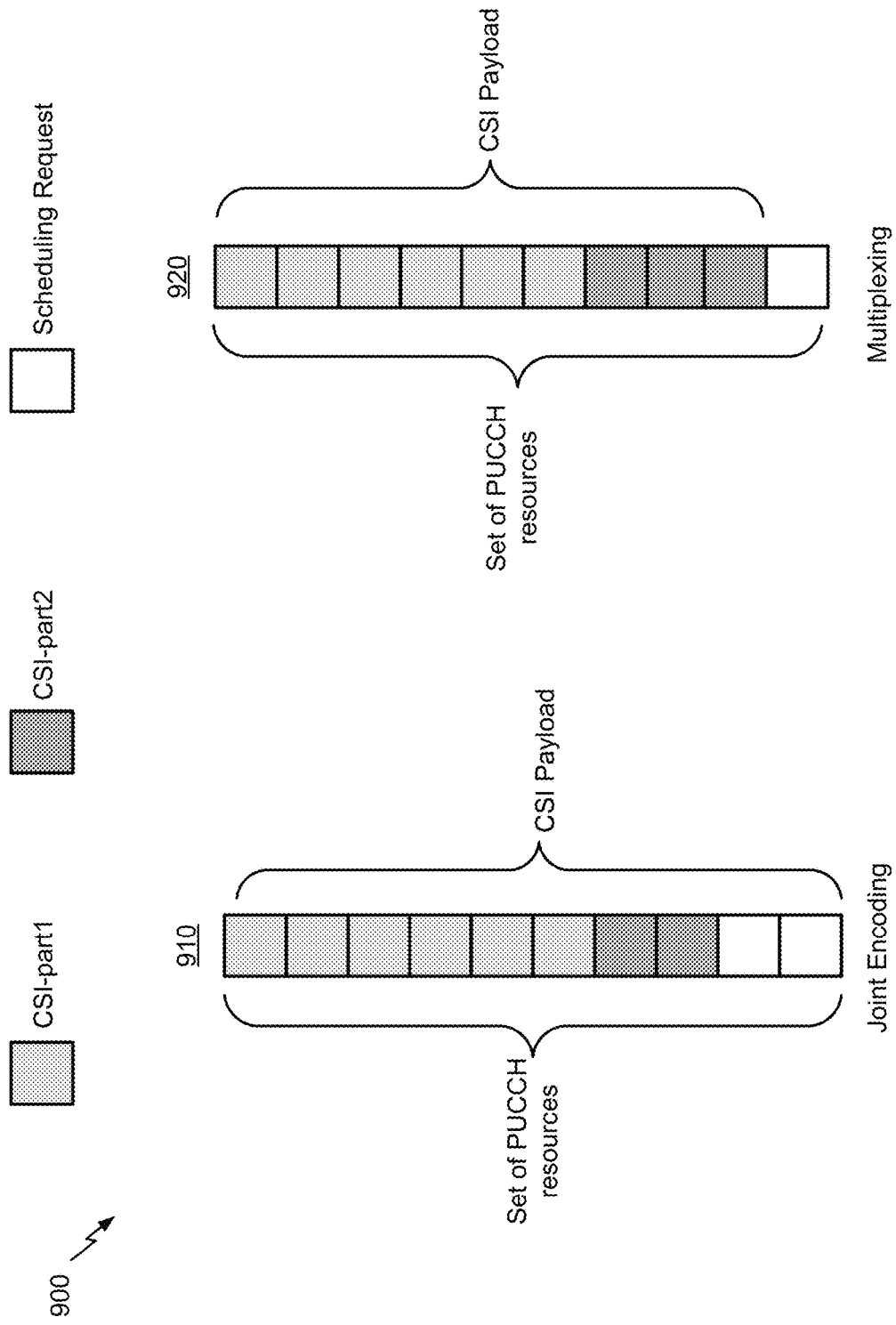

FIG. 9 is a diagram illustrating an example 900 of selecting physical uplink control channel (PUCCH) resources for channel state information, in accordance with various aspects of the present disclosure. In example 900, example CSI payloads are shown within sets of PUCCH resources, as corresponding to a parameter indicated to BS 110 and UE 120 and used to communicate a CSI payload, are shown to include an SR.

As shown by reference number 910, UE 120 may perform joint encoding of the SR and the CSI payload, such that the SR is included within the CSI payload. As shown by reference number 920, UE 120 may perform multiplexing of the SR and CSI payload such that the SR are both included within the set of PUCCH resources that may be used to send the CSI payload, but the SR is not included within the CSI payload.

As indicated above, FIG. 9 is provided as an example. Other examples may differ from what is described with respect to FIG. 9.

FIG. 10 is a diagram illustrating an example process 1000 performed, for example, by a UE, in accordance with various aspects of the present disclosure. Example process 1000 is an example where a UE (e.g., UE 120) selects PUCCH resources for CSI.

As shown in FIG. 10, in some aspects, process 1000 may include determining a set of physical uplink control channel (PUCCH) resources that may be used to transmit a channel state information (CSI) payload based at least in part on a parameter for constructing the CSI payload (block 1010). For example, UE 120 (e.g., using transmit processor 264, TX MIMO processor 266, controller/processor 280, and/or the like) may determine the set of PUCCH resources that are to be used to transmit the CSI payload to BS 110. In some aspects, UE 120 may determine the set of PUCCH resources based at least in part on receiving a configuration indicating the parameter, being configured to use the parameter, and/or the like.

As further shown in FIG. 10, in some aspects, process 1000 may include transmitting the CSI payload, to a base station (BS), using one or more resources from the set of PUCCH resources (block 1020). For example, UE 120 (e.g., using transmit processor 264, TX MIMO processor 266, controller/processor 280, and/or the like) may transmit the CSI payload to BS 110. In some aspects, UE 120 may CSI payload based at least in part on determining the set of PUCCH resources that may be used to transmit the CSI payload.

Process 1000 may include additional aspects, such as any single aspect or any combination of aspects described below and/or in connection with one or more other processes described elsewhere herein.

In a first aspect, the parameter is predetermined according to a specification associated with a network of the UE. In a second aspect, alone or in combination with the first aspect, content of the CSI payload is based at least in part on a downlink channel quality of a channel used for communication with the BS. In a third aspect, alone or in combination with one or more of the first and second aspects, the parameter is different from a parameter used to construct the CSI payload. In a fourth aspect, alone or in combination with one or more of the first through third aspects, the parameter is representative of a capacity of the set of PUCCH resources.

In a fifth aspect, alone or in combination with one or more of the first through fourth aspects, regardless of a size of the CSI payload, the parameter corresponds to a maximum size of the CSI payload or a minimum size of the CSI payload. In a sixth aspect, alone or in combination with one or more of the first through fifth aspects, the parameter is representative of a minimum size of the CSI payload. In a seventh aspect, alone or in combination with one or more of the first through sixth aspects, the parameter is representative of a maximum size of the CSI payload.

In an eighth aspect, alone or in combination with one or more of the first through seventh aspects, the CSI payload includes a CSI-part1 payload and a CSI-part2 payload. In a ninth aspect, alone or in combination with one or more of the first through eighth aspects, the UE is configured to determine that a size of the CSI payload exceeds a capacity of the set of PUCCH resources, and configured to drop one or more blocks of the CSI-part2 payload based at least in part on the size of the CSI payload exceeding the capacity of the set of PUCCH resources. In a tenth aspect, alone or in combination with one or more of the first through ninth aspects, the UE is configured to determine that a size of the CSI payload is less than a capacity of the set of PUCCH resources, and configured to copy one or more blocks of the CSI-part2 payload into the CSI payload based at least in part on the size of the CSI payload being less than the capacity of the set of PUCCH resources.

In an eleventh aspect, alone or in combination with one or more of the first through tenth aspects, the parameter is configurable based at least in part on one or more thresholds associated with constructing the CSI payload. In a twelfth aspect, alone or in combination with one or more of the first through eleventh aspects, the CSI payload includes a scheduling request. In a thirteenth aspect, alone or in combination with one or more of the first through twelfth aspects, when one or more scheduling request occasions are to be transmitted during transmission of the CSI payload, a portion of the CSI payload includes a scheduling request. In a fourteenth aspect, alone or in combination with one or more of the first through thirteenth aspects, a starting symbol of the one or more scheduling request occasions is a same starting symbol as the CSI payload. In a fifteenth aspect, alone or in combination with one or more of the first through fourteenth aspects, a size of the scheduling request is based at least in part on a number of the scheduling request occasions that overlap the CSI payload. In a sixteenth aspect, alone or in combination with one or more of the first through fifteenth aspects, the portion of the CSI payloads that includes the scheduling request is one bit. In a seventeenth aspect, alone or in combination with one or more of the first through sixteenth aspects, the portion of the CSI payloads that includes the scheduling request is a number of bits that corresponds to a number of the one or more scheduling request occasions.

In an eighteenth aspect, alone or in combination with one or more of the first through seventeenth aspects, one or more bits of a scheduling request are multiplexed with the CSI payload within the one or more resources. In a nineteenth aspect, alone or in combination with one or more of the first through eighteenth aspects, one or more bits of a scheduling request occupy designated resource elements of the one or more resources and the CSI payload occupies remaining resource elements of the one or more resources that are not the designated resource elements. In a twentieth aspect, alone or in combination with one or more of the first through nineteenth aspects, the UE is configured to use at least one of a resource element mapping or beta factors to allocate one or more resource elements between a scheduling request and the CSI payload.

Although FIG. 10 shows example blocks of process 1000, in some aspects, process 1000 may include additional blocks, fewer blocks, different blocks, or differently arranged blocks than those depicted in FIG. 10. Additionally, or alternatively, two or more of the blocks of process 1000 may be performed in parallel.

Figure 11:
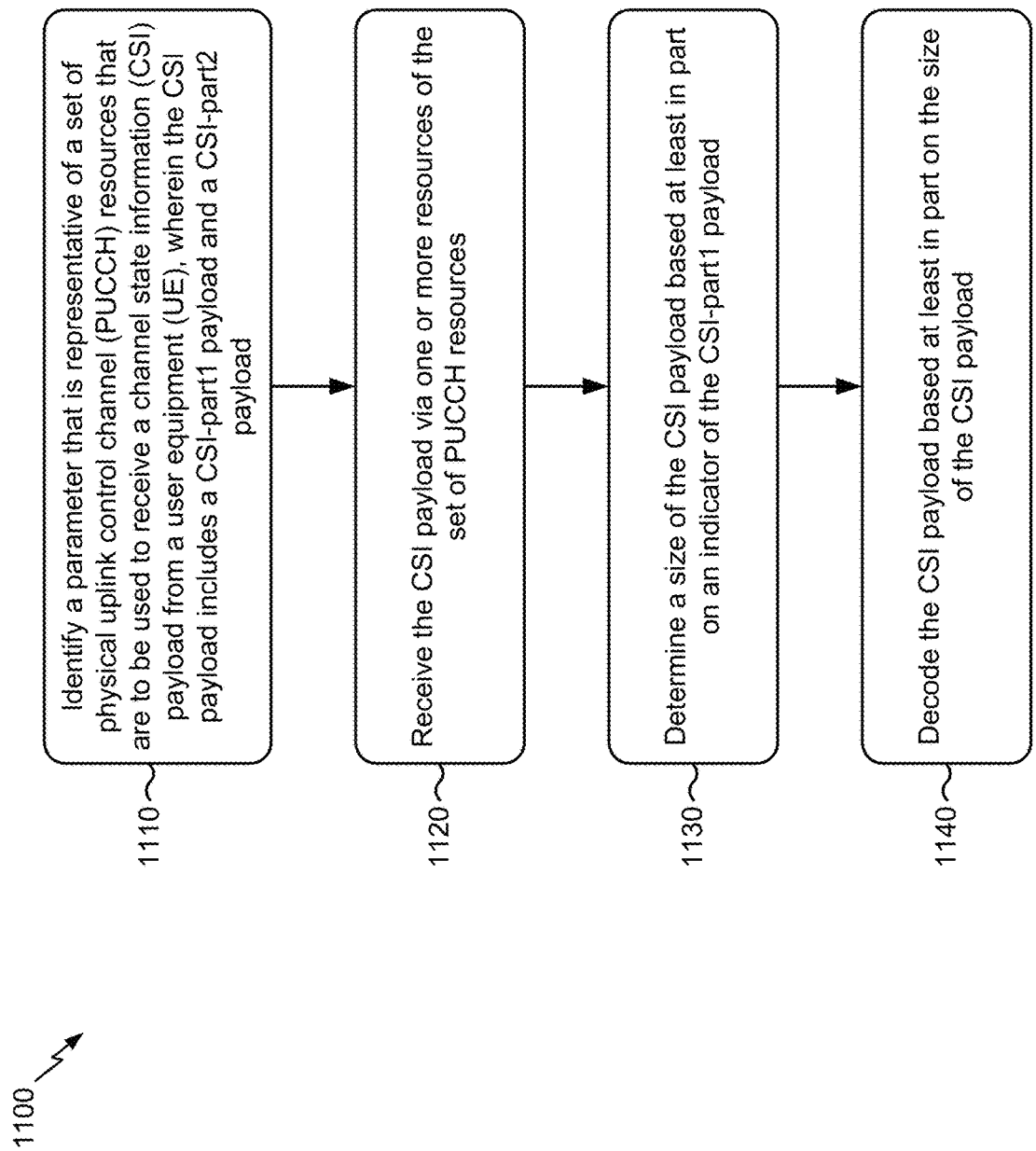
FIG. 11 is a diagram illustrating an example process performed, for example, by a base station, in accordance with various aspects of the present disclosure.

FIG. 11 is a diagram illustrating an example process 1100 performed, for example, by a BS, in accordance with various aspects of the present disclosure. Example process 1100 is an example where a BS (e.g., BS 110) determines which PUCCH resources include CSI.

As shown in FIG. 11, in some aspects, process 1100 may include identifying a parameter that is representative of a set of physical uplink control channel (PUCCH) resources that are to be used to receive a channel state information (CSI) payload from a user equipment (UE), wherein the CSI payload includes a CSI-part1 payload and a CSI-part2 payload (block 1110). For example, BS 110 (e.g., using MIMO detector 236, receive processor 238, controller/processor 240, and/or the like) may identify the parameter to receive the CSI payload from UE 110. In some aspects, BS 110 may identify the parameter based at least in part on receiving a configuration indicating the parameter, being configured to use the parameter, and/or the like.

As further shown in FIG. 11, in some aspects, process 1100 may include receiving the CSI payload via one or more resources of the set of PUCCH resources (block 1120). For example, BS 110 (e.g., using MIMO detector 236, receive processor 238, controller/processor 240, and/or the like) may receive the CSI payload from UE 120. In some aspects, BS 110 may receive the CSI payload based at least in part on identifying the parameter, and/or the like.

As further shown in FIG. 11, in some aspects, process 1100 may include determining a size of the CSI payload based at least in part on an indicator of the CSI-part1 payload (block 1130). For example, BS 110 (e.g., using MIMO detector 236, receive processor 238, controller/processor 240, and/or the like) may determine a size of the CSI payload. In some aspects, BS 110 may determine the size of the CSI payload based at least in part on receiving the CSI payload.

As further shown in FIG. 11, in some aspects, process 1100 may include decoding the CSI payload based at least in part on the size of the CSI payload (block 1140). For example, BS 110 (e.g., using MIMO detector 236, receive processor 238, controller/processor 240, and/or the like)

may decode the CSI payload. In some aspects, BS 110 may decode the CSI payload based at least in part on determining the size of the CSI payload.

Process 1100 may include additional aspects, such as any single aspect or any combination of aspects described below and/or in connection with one or more other processes described elsewhere herein.

In a first aspect, the parameter is one of a set of parameters, wherein each parameter of the set of parameters indicates a corresponding set of PUCCH resources capable of being used for receiving the CSI payload and the BS is configured to monitor each PUCCH resource of each set of PUCCH resources to receive the CSI payload. In a second aspect, alone or in combination with the first aspect, the parameter is a predetermined parameter according to a specification of a network associated with the BS and UE.

Although FIG. 11 shows example blocks of process 1100, in some aspects, process 1100 may include additional blocks, fewer blocks, different blocks, or differently arranged blocks than those depicted in FIG. 11. Additionally, or alternatively, two or more of the blocks of process 1100 may be performed in parallel.

Figure 12:
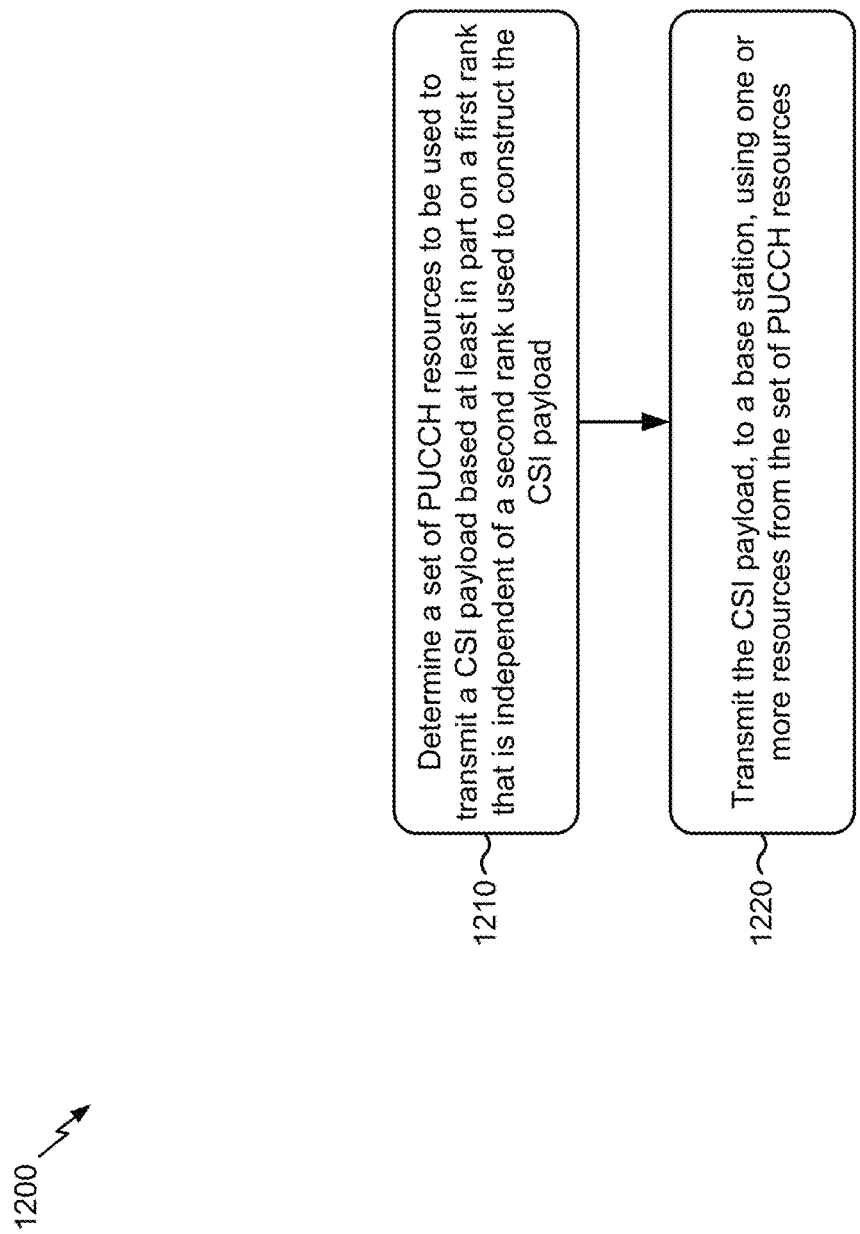
FIG. 12 is a diagram illustrating another example process performed, for example, by a user equipment, in accordance with various aspects of the present disclosure.

FIG. 12 is a diagram illustrating an example process 1200 performed, for example, by a UE, in accordance with various aspects of the present disclosure. Example process 1200 is an example where a UE (e.g., UE 120 and/or the like) performs operations associated with selecting PUCCH resources for CSI.

As shown in FIG. 12, in some aspects, process 1200 may include determining a set of physical uplink control channel (PUCCH) resources to be used to transmit a channel state information (CSI) payload based at least in part on a first rank that is independent of a second rank used to construct the CSI payload (block 1210). For example, the UE (e.g., using receive processor 258, transmit processor 264, controller/processor 280, memory 282, and/or the like) may determine a set of physical uplink control channel (PUCCH) resources to be used to transmit a channel state information (CSI) payload based at least in part on a first rank that is independent of a second rank used to construct the CSI payload, as described above.

As further shown in FIG. 12, in some aspects, process 1200 may include transmitting the CSI payload, to a base station (BS), using one or more resources from the set of PUCCH resources (block 1220). For example, the UE (e.g., using receive processor 258, transmit processor 264, controller/processor 280, memory 282, and/or the like) may transmit the CSI payload, to a base station (BS), using one or more resources from the set of PUCCH resources, as described above.

Process 1200 may include additional aspects, such as any single implementation or any combination of aspects described below and/or in connection with one or more other processes described elsewhere herein.

In a first aspect, the first rank is predetermined according to a specification associated with a network of the UE. In a second aspect, alone or in combination with the first aspect, the first rank is different from the second rank. In a third aspect, alone or in combination with one or more of the first through second aspects, regardless of a size of the CSI payload, the first rank corresponds to a maximum size of the CSI payload or a minimum size of the CSI payload. In a fourth aspect, alone or in combination with one or more of the first through third aspects, the first rank is representative of a minimum size of the CSI payload. In a fifth aspect, alone or in combination with one or more of the first through fourth aspects, the CSI payload includes a CSI-part1 payload and a CSI-part2 payload.

In a sixth aspect, alone or in combination with one or more of the first through fifth aspects, the UE is configured to determine that a size of the CSI payload exceeds a capacity of the set of PUCCH resources and is configured to drop one or more blocks of the CSI-part2 payload based at least in part on determining that the size of the CSI payload exceeds the capacity of the set of PUCCH resources. In a seventh aspect, alone or in combination with one or more of the first through sixth aspects, the UE is configured to determine that a size of the CSI payload is less than a capacity of the set of PUCCH resources and is configured to copy one or more blocks of the CSI-part2 payload into the CSI payload based at least in part on determining that the size of the CSI payload is less than the capacity of the set of PUCCH resources.

In an eighth aspect, alone or in combination with one or more of the first through seventh aspects, when one or more scheduling request occasions are to be transmitted during transmission of the CSI payload, a portion of the CSI payload includes a scheduling request. In a ninth aspect, alone or in combination with one or more of the first through eighth aspects, a size of the scheduling request is based at least in part on a number of the scheduling request occasions that overlap the CSI payload. In a tenth aspect, alone or in combination with one or more of the first through ninth aspects, the portion of the CSI payloads that includes the scheduling request is one bit. In an eleventh aspect, alone or in combination with one or more of the first through tenth aspects, the portion of the CSI payloads that includes the scheduling request is a number of bits that corresponds to a number of the one or more scheduling request occasions. In a twelfth aspect, alone or in combination with one or more of the first through eleventh aspects, one or more bits of a scheduling request are multiplexed with the CSI payload within the one or more resources.

Although FIG. 12 shows example blocks of process 1200, in some aspects, process 1200 may include additional blocks, fewer blocks, different blocks, or differently arranged blocks than those depicted in FIG. 12. Additionally, or alternatively, two or more of the blocks of process 1200 may be performed in parallel.

The foregoing disclosure provides illustration and description, but is not intended to be exhaustive or to limit the aspects to the precise form disclosed. Modifications and variations may be made in light of the above disclosure or may be acquired from practice of the aspects.

As used herein, the term component is intended to be broadly construed as hardware, firmware, or a combination of hardware and software. As used herein, a processor is implemented in hardware, firmware, or a combination of hardware and software.

As used herein, satisfying a threshold may refer to a value being greater than the threshold, greater than or equal to the threshold, less than the threshold, less than or equal to the threshold, equal to the threshold, not equal to the threshold, and/or the like.

It will be apparent that systems and/or methods, described herein, may be implemented in different forms of hardware, firmware, or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. A phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items, and may be used interchangeably with "one or more." Furthermore, as used herein, the terms "set" and "group" are intended to include one or more items (e.g., related items, unrelated items, a combination of related and unrelated items, etc.), and may be used interchangeably with "one or more." Where only one item is intended, the term "only one" or similar language is used. Also, as used herein, the terms "has," "have," "having," and/or the like are intended to be open-ended terms. Further, the phrase "based on" is intended to mean "based, at least in part, on" unless explicitly stated otherwise.

What is claimed is:

1. A method of wireless communication performed by a user equipment (UE), comprising:
   determining a set of physical uplink control channel (PUCCH) resources to be used to transmit a channel state information (CSI) payload based at least in part on a first value of a rank indicator that is independent of a second value of the rank indicator used to construct the CSI payload,
      the rank indicator corresponding to a downlink channel quality determined by the UE; and
   transmitting the CSI payload, to a base station (BS), using one or more resources from the set of PUCCH resources.

2. The method of claim 1, wherein the first value of the rank indicator is predetermined according to a specification associated with a network of the UE.

3. The method of claim 1, wherein the first value of the rank indicator is different from the second value of the rank indicator.

4. The method of claim 1, wherein, regardless of a size of the CSI payload, the first value of the rank indicator corresponds to a maximum size of the CSI payload or a minimum size of the CSI payload.

5. The method of claim 1, wherein the first value of the rank indicator is representative of a minimum size of the CSI payload.

6. The method of claim 1, wherein the CSI payload includes a CSI-part1 payload and a CSI-part2 payload.

7. The method of claim 6, wherein the UE is configured to determine that a size of the CSI payload exceeds a capacity of the set of PUCCH resources and is configured to drop one or more blocks of the CSI-part2 payload based at least in part on determining that the size of the CSI payload exceeds the capacity of the set of PUCCH resources.

8. The method of claim 6, wherein the UE is configured to determine that a size of the CSI payload is less than a capacity of the set of PUCCH resources and is configured to copy one or more blocks of the CSI-part2 payload into the CSI payload based at least in part on determining that the size of the CSI payload is less than the capacity of the set of PUCCH resources.

9. The method of claim 1, wherein, when one or more scheduling request occasions are to be transmitted during transmission of the CSI payload, a portion of the CSI payload includes a scheduling request.

10. The method of claim 9, wherein a size of the scheduling request is based at least in part on a number of the scheduling request occasions that overlap the CSI payload.

11. The method of claim 9, wherein the portion of the CSI payloads that includes the scheduling request is one bit.

12. The method of claim 9, wherein the portion of the CSI payloads that includes the scheduling request is a number of bits that corresponds to a number of the one or more scheduling request occasions.

13. The method of claim 1, wherein one or more bits of a scheduling request are multiplexed with the CSI payload within the one or more resources.

14. A user equipment (UE) for wireless communication, comprising:
   a memory;
   one or more processors operatively coupled to the memory; and
   instructions stored in the memory and operable, when executed by the one or more processors to cause the UE to:
      determine a set of physical uplink control channel (PUCCH) resources to be used to transmit a channel state information (CSI) payload based at least in part on a first value of a rank indicator that is independent of a second value of the rank indicator used to construct the CSI payload,
         the rank indicator corresponding to a downlink channel quality determined by the UE; and
      transmit the CSI payload, to a base station (BS), using one or more resources from the set of PUCCH resources.

15. The UE of claim 14, wherein the first value of the rank indicator is different from the second value of the rank indicator.

16. The UE of claim 14, wherein, regardless of a size of the CSI payload, the first value of the rank indicator corresponds to a maximum size of the CSI payload or a minimum size of the CSI payload.

17. The UE of claim 14, wherein the first value of the rank indicator is representative of a minimum size of the CSI payload.

18. The UE of claim 14, wherein, when one or more scheduling request occasions are to be transmitted during transmission of the CSI payload, a portion of the CSI payload includes a scheduling request.

19. The UE of claim 18, wherein a size of the scheduling request is based at least in part on a number of the scheduling request occasions that overlap the CSI payload.

20. The UE of claim 14, wherein one or more bits of a scheduling request are multiplexed with the CSI payload within the one or more resources.

21. A non-transitory computer-readable medium storing one or more instructions for wireless communication, that, when executed by one or more processors of a user equipment (UE), cause the UE to:
- determine a set of physical uplink control channel (PUCCH) resources to be used to transmit a channel state information (CSI) payload based at least in part on a first value of a rank indicator that is independent of a second value of the rank indicator used to construct the CSI payload,
  - the rank indicator corresponding to a downlink channel quality determined by the UE; and
- transmit the CSI payload, to a base station (BS), using one or more resources from the set of PUCCH resources.

22. The non-transitory computer-readable medium of claim 21, wherein the first value of the rank indicator is different from the second value of the rank indicator.

23. The non-transitory computer-readable medium of claim 21, wherein, regardless of a size of the CSI payload, the first value of the rank indicator corresponds to a maximum size of the CSI payload or a minimum size of the CSI payload.

24. The non-transitory computer-readable medium of claim 21, wherein the first value of the rank indicator is representative of a minimum size of the CSI payload.

25. The non-transitory computer-readable medium of claim 21, wherein, when one or more scheduling request occasions are to be transmitted during transmission of the CSI payload, a portion of the CSI payload includes a scheduling request.

26. The non-transitory computer-readable medium of claim 25, wherein a size of the scheduling request is based at least in part on a number of the scheduling request occasions that overlap the CSI payload.

27. The non-transitory computer-readable medium of claim 21, wherein one or more bits of a scheduling request are multiplexed with the CSI payload within the one or more resources.

28. An apparatus for wireless communication, comprising:
- means for determining a set of physical uplink control channel (PUCCH) resources to be used to transmit a channel state information (CSI) payload based at least in part on a first value of a rank indicator that is independent of a second value of the rank indicator used to construct the CSI payload,
  - the rank indicator corresponding to a downlink channel quality determined by the UE; and
- means for transmitting the CSI payload, to a base station (BS), using one or more resources from the set of PUCCH resources.

29. The apparatus of claim 28, wherein the first value of the rank indicator is different from the second value of the rank indicator.

30. The apparatus of claim 28, wherein, regardless of a size of the CSI payload, the first value of the rank indicator corresponds to a maximum size of the CSI payload or a minimum size of the CSI payload.

31. The apparatus of claim 28, wherein the first value of the rank indicator is representative of a minimum size of the CSI payload.

32. The apparatus of claim 28, wherein, when one or more scheduling request occasions are to be transmitted during transmission of the CSI payload, a portion of the CSI payload includes a scheduling request.

33. The apparatus of claim 32, wherein a size of the scheduling request is based at least in part on a number of the scheduling request occasions that overlap the CSI payload.

34. The apparatus of claim 28, wherein one or more bits of a scheduling request are multiplexed with the CSI payload within the one or more resources.

* * * * *